United States Patent [19]
Iyoda et al.

[11] Patent Number: 5,515,181
[45] Date of Patent: May 7, 1996

[54] IMAGE READING APPARATUS PROVIDING HIGH QUALITY IMAGES THROUGH SYNTHESIS OF SEGMENTED IMAGE DATA

[75] Inventors: Tetsuo Iyoda; Naosuke Ino; Hajime Sugino; Kazuhisa Ando, all of Kanagawa, Japan

[73] Assignee: Fuji Xerox Co., Ltd., Tokyo, Japan

[21] Appl. No.: 26,831

[22] Filed: Mar. 5, 1993

[30] Foreign Application Priority Data

Mar. 6, 1992 [JP] Japan .................................. 4-082903
Mar. 13, 1992 [JP] Japan .................................. 4-088265

[51] Int. Cl.$^6$ ........................... H04N 1/04; H04N 1/387; H04N 1/23
[52] U.S. Cl. ........................ 358/474; 358/296; 358/450
[58] Field of Search ............................... 358/296, 448, 358/450, 453, 474, 483, 488, 494, 497, 505, 513, 538; 355/233, 234, 235, 243, 244; 359/197–200

[56] References Cited

U.S. PATENT DOCUMENTS

| | | | |
|---|---|---|---|
| 4,837,635 | 6/1989 | Santos | 358/287 |
| 4,876,612 | 10/1989 | Honma et al. | 358/474 |
| 4,918,542 | 4/1990 | Nagashima et al. | 358/474 X |
| 4,947,269 | 8/1990 | Yamada | 358/451 X |
| 5,018,023 | 5/1991 | Kubota | 358/450 |
| 5,223,954 | 6/1993 | Miyakawa et al. | 358/474 |
| 5,227,896 | 7/1993 | Ozawa et al. | 358/474 |
| 5,282,055 | 1/1994 | Suzuki | 358/474 X |

*Primary Examiner*—Peter S. Wong
*Assistant Examiner*—Eric Frahm
*Attorney, Agent, or Firm*—Finnegan, Henderson, Farabow, Garrett & Dunner

[57] ABSTRACT

An image reading apparatus for obtaining a digital image having gradation of binary-level or multi level in a computer, a word processor, a digital copying machine, or like apparatus. The image reading apparatus includes an imaging device, an optical unit located for exposing the imaging device and capable of moving in two directions perpendicular to each other, a reading operation control unit for controlling a first reading operation in which whole information of the original image is read, and a second reading operation in which division image information in division areas of the original image is read, a resolution setting unit for setting a resolution in the second reading operation, and a data processing unit for connecting a plurality of division image information sets which are read in a plural number of times of the second reading operations, as a front view image information on the original image.

20 Claims, 21 Drawing Sheets

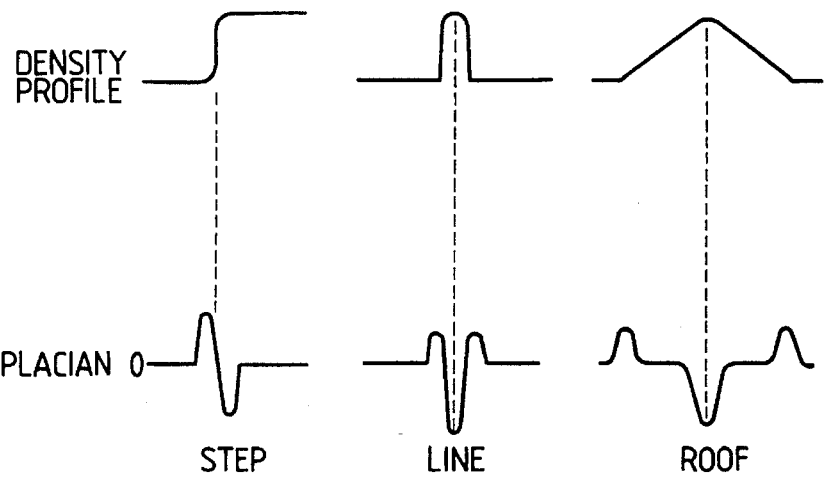
FIG. 4(a)
FIG. 4(b)
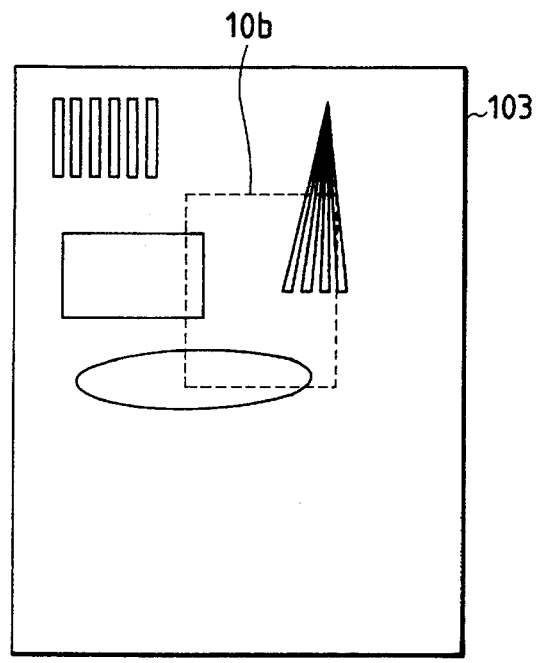
FIG. 5

OVERLAP PORTION 351

OVERLAP PORTION 351

CONNECTING BOUNDARY

IMAGE READING APPARATUS PROVIDING HIGH QUALITY IMAGES THROUGH SYNTHESIS OF SEGMENTED IMAGE DATA

BACKGROUND OF THE INVENTION

The present invention relates to an image reading apparatus for obtaining a digital image having gradation of binary-level or multilevel in a computer, a word processor, a digital copying machine or the like.

In an exemplary image reading apparatus used in a computer or the like, as shown in FIG. 14, an original 203 is placed on the upper side of a housing 201 which includes a platen glass (not shown) at the upper surface thereof, so as to read an image from the original 203. A reduction optical system, disposing the housing 201 includes a light source 205, mirrors 207, a lens 209, and a solid-state imaging device (for example, a CCD) 211.

Another type of image reading apparatus, as shown in FIG. 15, includes a light source 205A, a rod lens array 213, and a contact-type sensor 215 which constitute an isometric optical system. These optical elements are disposed in a housing 201A which includes a platen glass (not shown) at the upper surface thereof. A light emitted from the light source 205 or 205A is reflected from the original 203 or 203A. The reflected light is incident on the solid-state imaging device 211 or the contact-type sensor 215 through the reduction or isometric optical system so as to form an image. Then, the reflected light corresponding to the density of the original is converted into an electric signal.

According to each of the above conventional configurations, it is necessary to provide the platen glass for placing the original 203 or 203A thereon, so that the width and depth of the apparatus are required to be larger than those of the original 203 or 203A. Regarding the height of the image reading apparatus, a height of about 10 to 30 cm is required to contain the reduction or isometric optical system. Therefore, a problem exists in that the size of the image reading apparatus is large.

Since the conventional image reading apparatus is relatively large, it cannot be utilized for inputting an image into a personal computer, a word processor, or the like which is located on a desk for personal use. Thus, it is greatly desirable to miniaturize an image reading apparatus.

An image reading apparatus 100 of desktop type which can obtain an image with desired resolution can be realized as shown in FIG. 13, by providing a scan mechanism unit 1 having optical means, capable of forming an image with variable magnification, and a solid-state imaging device which is disposed so as to have a predetermined positional relationship with respect to the optical image forming means.

The image reading apparatus 100 is constructed in such a manner that the scan mechanism unit 1 is fixed at the upper end of a support column 102 which stands on a flat plate 101, so that an imaging device therein can read an original 103 placed on a desk or other flat surface. In the image reading apparatus 100, the distance between the original 103 and the imaging device is larger than that in a conventional image reading apparatus. Accordingly, the image reading apparatus 100 has a problem in that, although the imaging device is fixed, the image thus read can be shifted to a large extent from the intended reading position by a slight directional deviation of the imaging device.

Therefore, the mechanical system which controls the imaging direction and the position of the image reading apparatus is required to operate with high positional accuracy. This limits the miniaturization of the scan mechanism unit 1 and hence it is difficult to miniaturize the image reading apparatus.

SUMMARY OF THE INVENTION

The present invention has been created in view of the above-described circumstances, and an object of the invention is to provide an image reading apparatus which can be miniaturized and which connects images with high accuracy even when the imaging system has a slight directional deviation in the image reading process.

In order to attain the above object, the present invention provides an image reading apparatus for reading an original image, including: an imaging device; optical means located for exposing the imaging device and capable of moving in two directions perpendicular to each other; a reading operation control unit for controlling a first reading operation in which whole information of the original image is read, and a second reading operation in which division image information in division areas of the original image is read; resolution setting means for setting a resolution in the second reading operation; and a data processing unit for connecting a plurality of division image information sets which are read in a plural number of times of the second reading operations, as front image information of the original image.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate a preferred embodiment of the invention and together with the description provide an explanation of the objects, advantages and principles of the invention. In the drawings:

FIG. 4(a) is a waveform chart showing image signals extracted by the imaging device.

FIG. 4(b) is a waveform chart showing the Laplacian of the waveforms.

FIG. 5 is a diagram illustrating an edge extracted image which is obtained from the whole image.

DETAILED DESCRIPTION OF THE PREFERRED EMBODIMENTS

Hereinafter, a first embodiment of the invention will be described with reference to FIGS. 1 to 11.

First, an image reading apparatus of this embodiment will be described with reference to FIGS. 10 and 11. An image reading apparatus 100A, as shown in FIG. 11, is constructed in such a manner that a scan mechanism unit 1A and a light source 104 are fixed at an upper end of a support column 102 standing on an end portion of a flat plate 101A on which an original 103A can be placed. The light source 104 elongates along a side of the flat plate 101A. The intensity of light which is emitted from the light source 104 and incident on the flat plate 101A can be controlled by a light adjuster (FIG. 1) disposed in the scan mechanism unit 1A.

Figure 10:
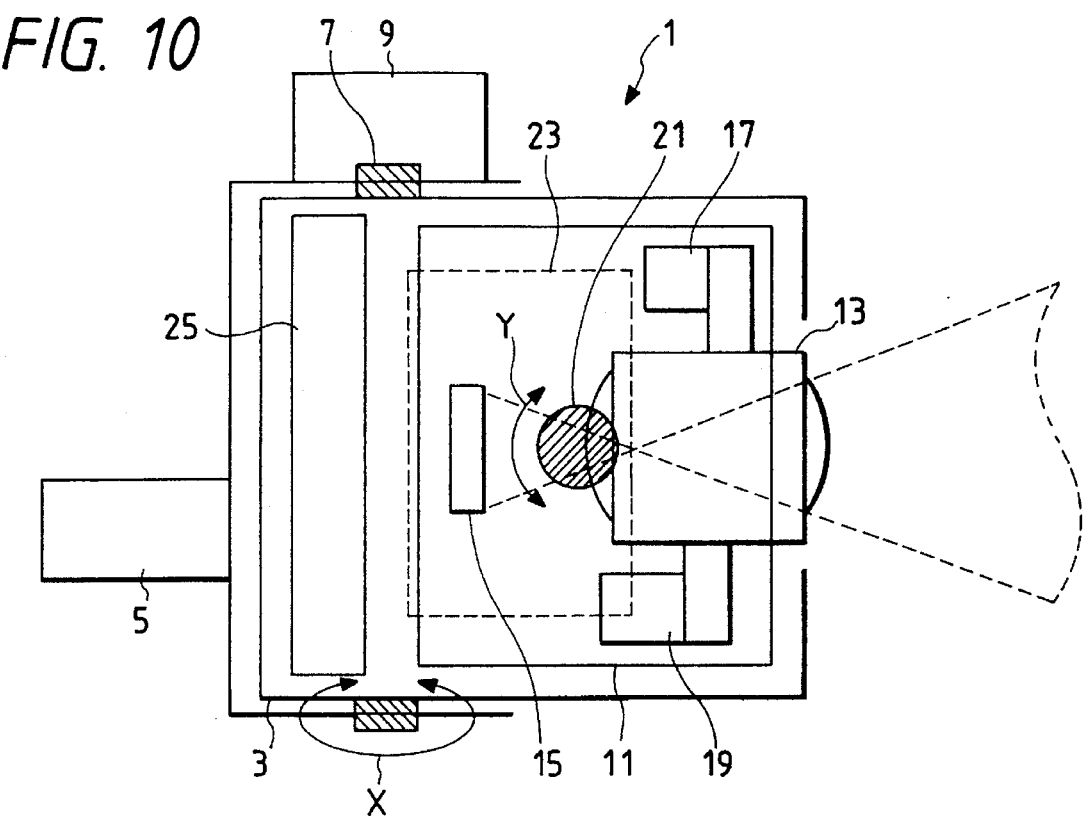
FIG. 10 is a diagram illustrating the configuration of the body of the image reading apparatus of the first embodiment.
Figure 11:
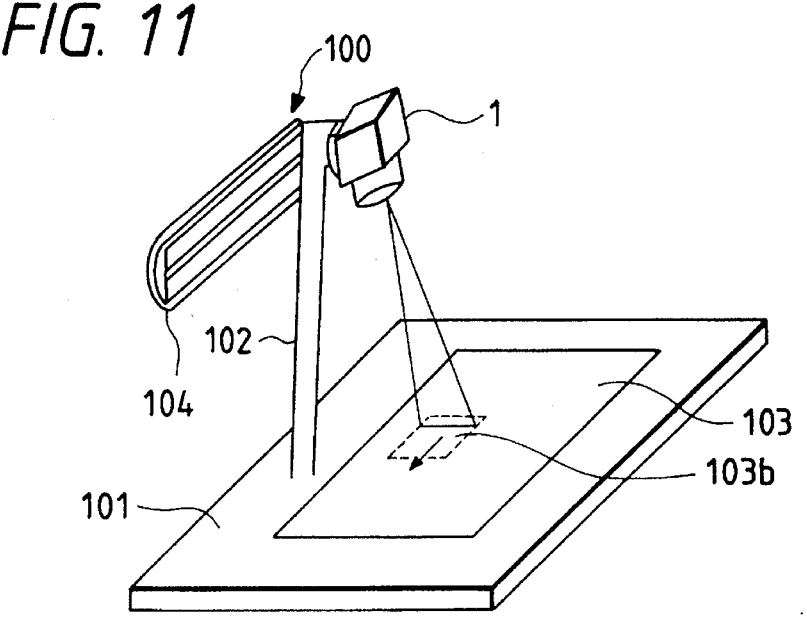
FIG. 11 is a perspective view illustrating the configuration of the whole of the image reading apparatus.

In the scan mechanism unit 1A, as shown in FIG. 10, a horizontally movable housing 3 is attached to a supporting portion 5. The horizontally movable housing 3 is disposed to rotate about a horizontal scan axis 7 in an X direction (an arbitrary direction). A horizontal scan mechanism 9 is disposed to rotate the horizontally movable housing 3.

A vertically movable housing 11 is attached to the horizontally movable housing 3. A camera manipulator controller (FIG. 1) is attached to the vertically movable housing 11. The camera manipulator controller includes image forming optical means 13, a solid-state imaging device 15, an image forming magnification control mechanism 17, and a focal point control mechanism 19. The solid-state imaging device 15 consists, for example, of a CCD two-dimensional image sensor, an MOS two-dimensional image sensor, a bipolar two-dimensional image sensor, an amorphous silicon TFT two-dimensional image sensor, or the like. A driving process circuit unit 25 is attached to the horizontally movable housing 3. The driving process circuit unit 25 includes a microcomputer, an image reading circuit portion and an image processing circuit portion.

The vertically movable housing 11 can rotate about a vertical scan axis 21 in a Y direction (another direction) perpendicular to the X direction. The vertically movable housing 11 is driven by a vertical scan mechanism 23. Thus, the imaging optical means 13 and the solid-state imaging device 15 are disposed so as to be rotatable in the two directions X and Y which are perpendicular to each other (or to constitute a gyro mechanism). Next, the image reading operation conducted by the above image reading apparatus will be described with reference to FIGS. 1, 2, 10 and 11.

Under the control of the microcomputer 30, a signal is fed to a control unit 31 including a light adjuster 31a and a camera manipulator controller 31b, and an image reading unit 32 which are disposed in the scan mechanism unit 1, so that the intensity of light from the light source 104 is adjusted and the reading position, magnification, iris and focal point of the image reading apparatus 100 are also adjusted. Then, the reading operation of the solid-state imaging device 15 is started.

More specifically, the solid-state imaging device 15 is adjusted in direction by the gyro mechanism in the scan mechanism unit 1 so that the whole image on the original 103A can be read, and the reading (prescan) of the whole image is performed as a first reading process. A resolution by which the whole original image can be read is designated by the image forming magnification control mechanism 17. Thus, an image without blooming can be formed on the solid-state imaging device 15 through the image forming optical means under the control of the focal point control mechanism 19.

The image information is photoelectrically converted in the solid-state imaging device 15, and further converted into a digital form by an A/D converter 32a. Thereafter, the information is corrected by a dark offset correction circuit 32b and a shading correction circuit 32c. The corrected information is transmitted to the image processing unit 34 through a whole image memory 33. Assuming that the number of gradation levels of the output is 256, i.e., 0 to 255, the dark offset correction circuit 32b and the shading correction circuit 32c output a correction value I represented by the following expression for the output $1_{doc}$ of the read pixel, using clear output data Iw and dark output data 1b which are stored in a memory:

$$I=255(1_{doc}-Ib)/(Iw-Ib)$$

By this correction, the output nonuniformity between pixels of the solid-state imaging device 15 and the intensity nonuniformity of light from the light source are corrected to a certain degree.

Figure 2:
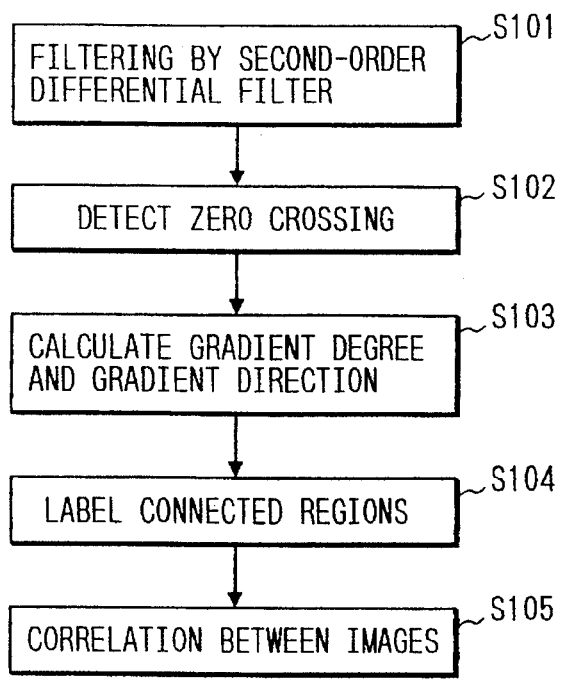
FIG. 2 is a flowchart illustrating in detail the operation of the image processing unit shown in FIG. 1.
Figure 3:
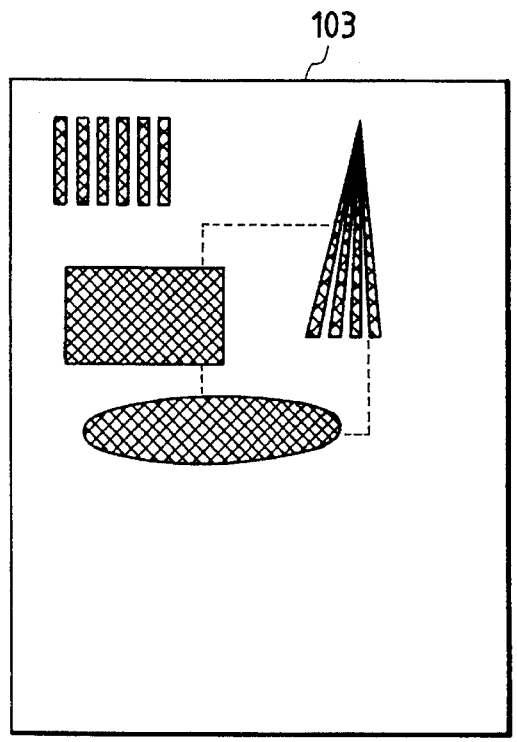
FIG. 3 is a diagram illustrating a whole image read by an imaging device.

In the image processing unit 34, the image processing for the whole image is performed in accordance with the procedure shown in the flowchart of FIG. 2.

First, a product-sum operation is performed on the read image (FIG. 3) by a spatial filter having a second-order differential characteristic (step S101). Specifically, a Laplacian transform is obtained by the product-sum operation between the brightness of the image (image data) f(x, y) on the x-y coordinates and a weighting factor matrix (for example, the outputs of upper, lower, right and left sides are considered using a matrix of 3 rows and 3 columns). With respect to the density profile signal output (stepped edge) of an image shown in FIG. 4(a), the Laplacian has positive and negative peaks on both of the sides, as shown in FIG. 4(b). A crossing point of a curve linking the positive and negative peaks and the 0 level corresponds to the edge position.

The method in which the crossing point is extracted as an edge element (the detection of zero crossing) (step S102) is called a zero crossing method. This method is widely used in the object recognition field or the like, and therefore the method is only briefly described herein.

The image which is transmitted through the spatial filter is scanned in the x direction and also in the y direction. The point where the sign of a pixel value is changed from positive to negative is regarded as a zero crossing point, and "1" is allocated to the point. At this time, the point where the sign is changed, "1" is allocated to either the positive pixel or the negative pixel whichever has the smaller absolute value.

Regarding the zero crossing point, the gradient degree $G_{ij}$, which corresponds to the contrast at the edge, and the gradient direction $\theta_{ij}$ which indicates a direction in which the density on the edge becomes brighter, are calculated (step S103). The direction perpendicular to $\theta_{ij}$ corresponds to the edge direction.

The gradient degree is obtained by the following expression:

$$G_{ij}=\{(I_{i,j}-I_{i+1,j+1})^2+(I_{i+1,j}-I_{i,j+1})^2\}^{1/2}$$

The gradient direction is obtained by the following expression $$\theta_{ij}=\tan^{-1}\{(I_{i,j-1}-I_{i,j+1})/(I_{i-1,j}-I_{i+1,j})\}$$

In the above expressions, $I_{ij}$ denotes a pixel density at a position (i, j).

A value of 0 is allocated to pixels which are not regarded as zero crossing pixels, whereby an edge extracted image $L_{ij}$ is created as a binary image (FIG. 5) in which the edge portion and portions other than the edge portion are differentiated.

Then, the edge portions A, B, C and D of the edge extracted image $L_{ij}$ are subjected to a labeling process for connected regions in which the portions are sequentially labeled with a number (step S104).

Figure 1:
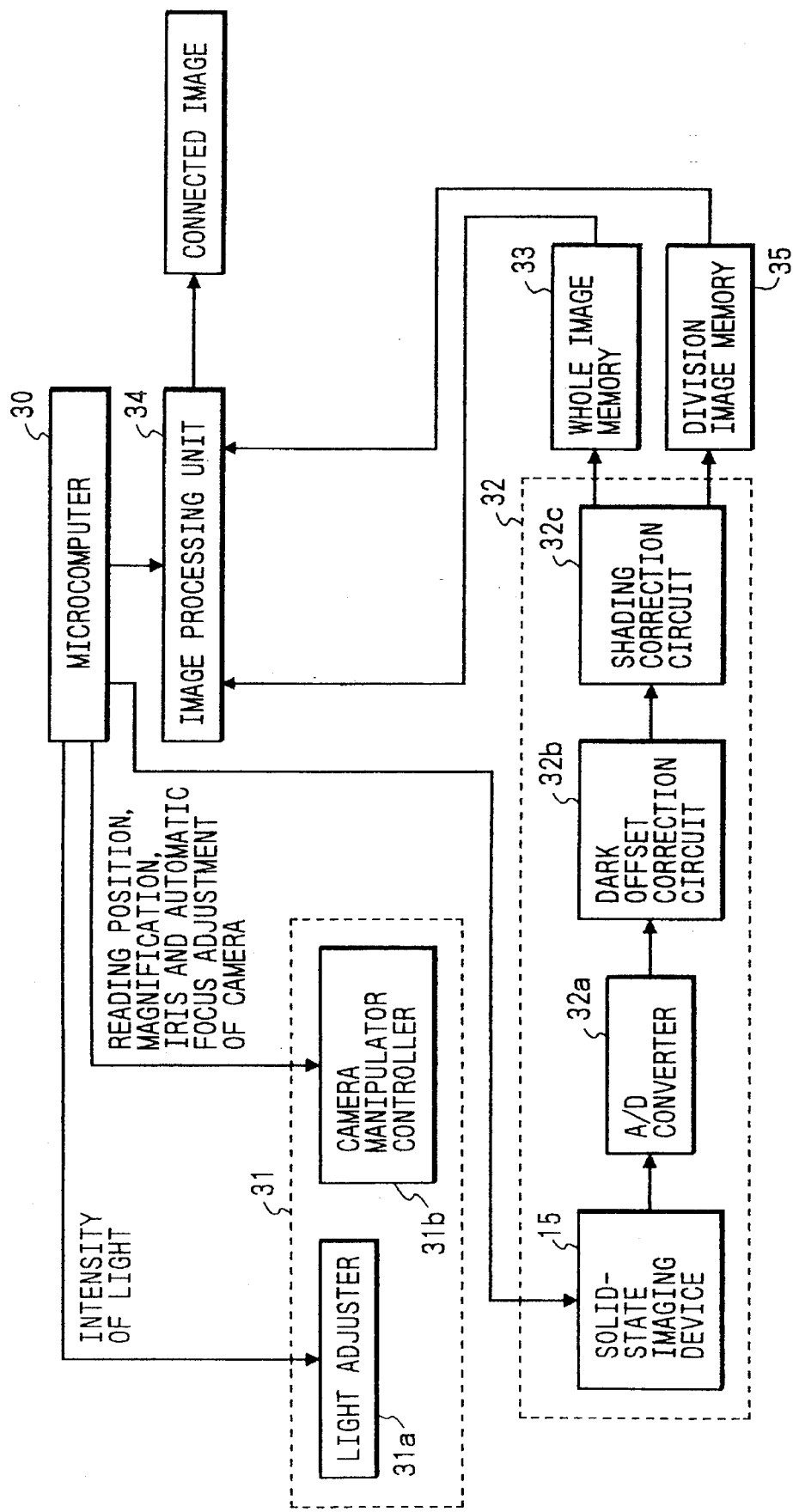
FIG. 1 is a block diagram illustrating a first embodiment of the image reading apparatus of the invention.

After completing the reading process for the whole image, a reading process (partial scan) is performed as the second reading process by the image reading portion 32 shown in FIG. 1 on areas which are obtained by dividing the original into a plurality of sections. The division image information is fed to the image processing unit 34 via a division image memory 35.

Figure 6:
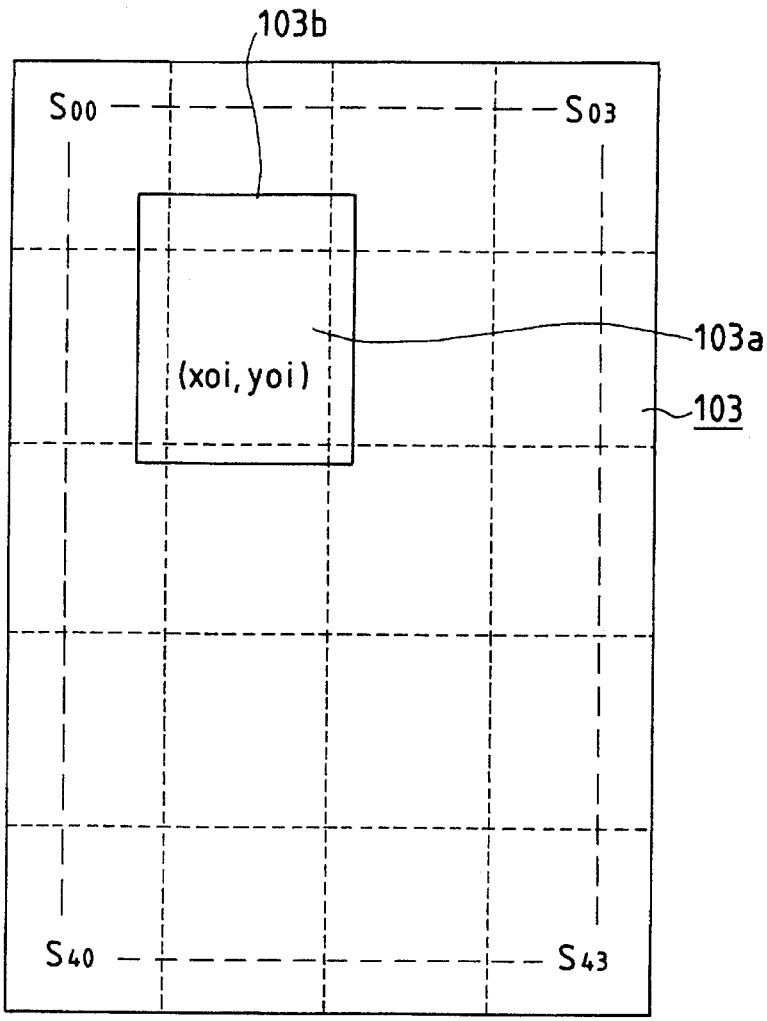
FIG. 6 is a diagram showing the positional relationship of division images with respect to a whole image.
Figure 7:
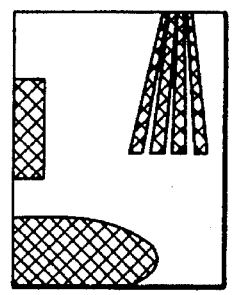
FIG. 7 is a diagram illustrating a divisional image read by an imaging device.

In the reading process for the sectional or division images, the magnification and the focal point are adjusted so that a reading area 103b (the position (x(oi), y(oi)) where the division image, or sectional portion of the whole image, is intended to be read) is larger by $\Delta x$ and $\Delta y$ than a division image 103a of the original 103A which is to be read in a division manner using the horizontal and vertical scan mechanisms (FIG. 6).

Figure 8:
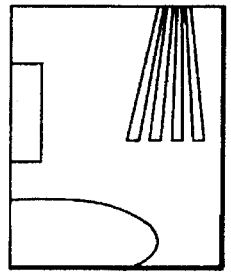
FIG. 8 is a diagram illustrating an edge extracted image obtained from a whole image.

Image processing for the image thus read is performed (FIG. 7) in the same steps as in the image processing for the whole image shown in the flowchart of FIG. 2, i.e., in the series of steps S101 to S104. Thus, an edge extracted image $I_{ij}$ shown in FIG. 8 is obtained. In the detection of the zero crossing, the gradient degree $g_{ij}$ and the gradient direction $\theta_{ij}$ are obtained in the same way as in the case of the whole image. Next, in step S105 of FIG. 2, the correlation between the images is obtained using the edge extracted image $L_{ij}$, the gradient degree $G_{ij}$ and the gradient direction $\theta_{ij}$ obtained for the whole image in the previous process, and the edge extracted image $1_{ij}$, and the gradient degree $g_{ij}$ and the gradient direction $\theta_{ij}$ for the division image, so as to perform the image connecting process.

Figure 9:
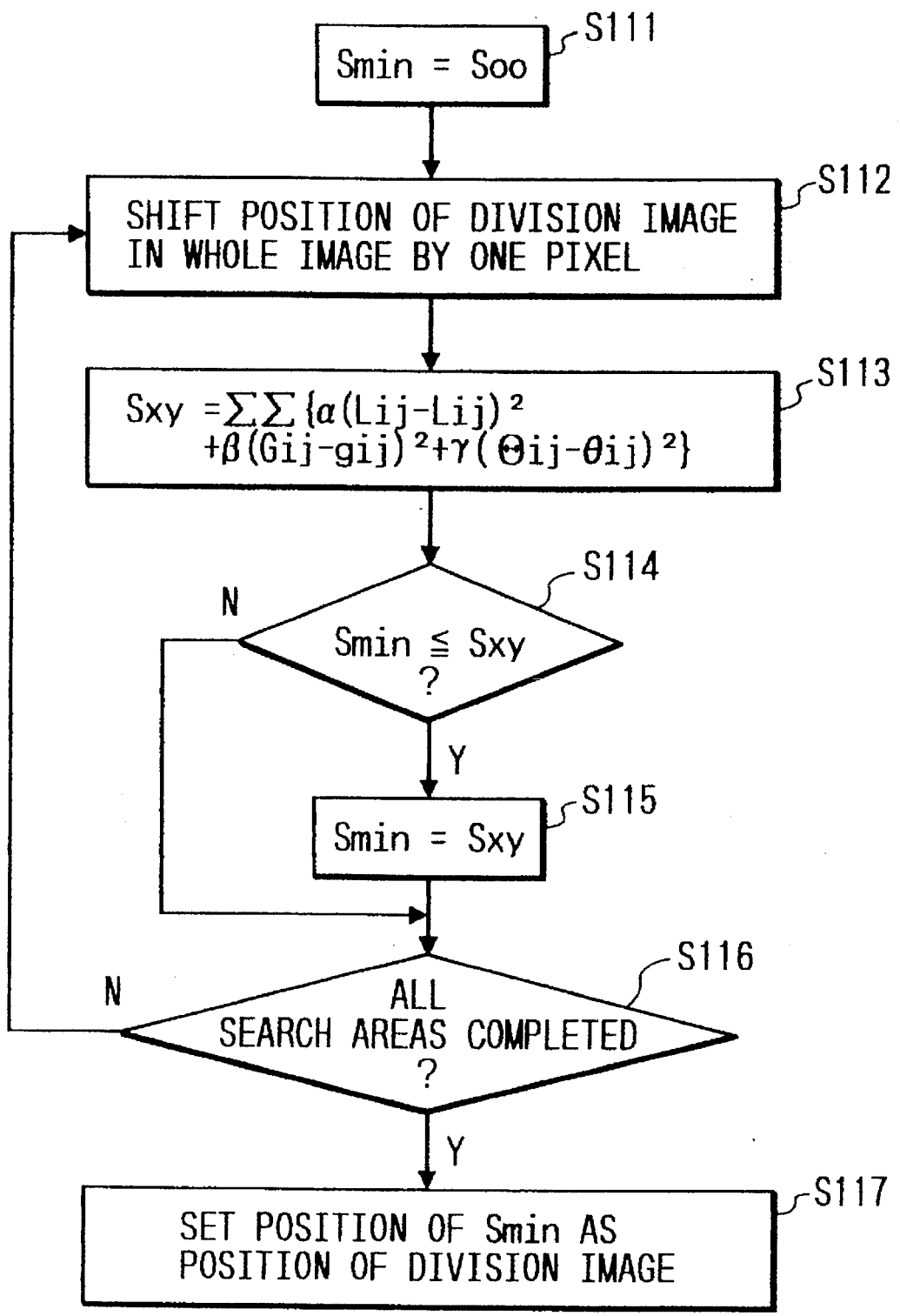
FIG. 9 is a flowchart illustrating the operation of obtaining the correlation between images.

First, the registration of the whole image and the respective division images is performed by obtaining the correlation between the edge extracted images shown in FIGS. 5 and 8 in accordance with the procedure shown in the flowchart of FIG. 9. Specifically, a position $S_{min}$ ($x_{oi}$, $y_{oi}$) where the division image is intended to be read is first set to be an upper left portion 500 of the reading original (step Sill). Then, the central point is moved within an area ($x_{oi}+\Delta x$, $y_{oi}+\Delta y$) centered about ($x_{oi}$, $y_{oi}$) (while shifting the central point by one pixel) (step S112). At each of the positions, a total sum $S_{xy}$ of values obtained by multiplying the square of the difference between the edge extracted images $L_{ij}$ and $l_{ij}$, the square of the difference between the gradient degrees $G_{ij}$ and $g_{ij}$ and the square of the difference between the gradient directions $\theta_{ij}$ and $\theta_{ij}$ by weighting factors, respectively, i.e., Sxy represented by the following expression (step S113):

$$S_{xy}=\Sigma\Sigma\{\alpha(L_{ij}l_{ij})^2+\beta(G_{ij}-g_{ij})^2+\gamma(\theta_{ij}-\theta_{ij})^2\}$$

In the above expression, $\alpha$, $\beta$, and $\gamma$ are predetermined constants for determining which is the most weighted one among the edge extracted image $l_{ij}$, the gradient degree $g_{ij}$, and the gradient direction $\theta_{ij}$. In a search area, a search is made for the value $S_{min}$ which is the smallest one of $S_{xy}$. The position $S_{min}$ is regarded as the position of the division image in the whole image, whereby a position where the edge of the division image most matches the respective edges of the whole image can be obtained.

The position is set as a coarse position ($x_{ci}$, $y_{ci}$) of each division image in the whole image (steps S114 to S117). This operation is performed a number of times which is equal to the number of the division images. For example, in the case of FIG. 6, the operation is performed 20 times for positions S00 to S43. Thus, the coarse positions of all of the division images in the whole image are obtained.

Next, in the same way as in the flowchart shown in FIG. 9, the matching of the edges of the division images is performed based on the positions $(x_{ci}, y_{ci})$ obtained in the previous process Specifically, for each of four division images, i.e., upper, lower, right and left division images of a central division image, a central point $(x_{fi}, y_{fi})$ of a division image is obtained where the largest number of edges match within an area $(x_{ci} \pm \Delta xf, y_{ci} \pm \Delta yf)$. The obtained central point $(x_{fi}, y_{fi})$ is substituted for the central point $(x_{ci}, y_{ci})$ of the upper lower, right and left division images of which the positions are precisely obtained. The matching of the edges of the division images is performed for each of the upper, lower, right and left division images of which the positions are precisely obtained, and for the remaining three directions on which the above process is not performed, so that the precise positions thereof are obtained. The procedure is repeated to obtain the precise positions of division images starting from division images at the center of the whole image to the peripheral portions, thereby performing the connecting process of the division images. Thus, the whole image is acquired by connecting the division images shown in FIG. 7.

According to the image reading apparatus of this embodiment, the process is performed with multiple resolutions. Namely, both the division images of the original 103A and the whole image are read. Coarse registration of the whole image and the division images is performed. Then, based on the coarse positions, the precise positions of the division images are obtained. Accordingly, the time period required for search can be shortened and hence the total processing time period can be shortened, as compared with the case where only the division images read with high resolution are compared and connected, because it is unnecessary to conduct the search for the position in a wide area.

The registration of the division images and the whole image is performed so that the matching of images with low resolution is previously performed. Therefore, if noises are processed as edges when the matching of the edges is performed, noises which may occur in an image with high resolution can be eliminated.

Even when many edges of similar shape exist, the exactly corresponding one can be easily found.

Moreover, in a scan mechanism of the image reading apparatus, the positional deviation in reading is corrected by the image processing, so that the scan mechanism unit can be small-sized and inexpensive.

In the above-described image reading apparatus, the light source 104 which is fixed to the image reading apparatus or a lighting fitting which is externally provided (a room fluorescent lamp, etc.) is used as the light source for reading the original. Therefore, the brightness varies depending on the position of the original to be read thereby causing nonuniformity of light intensity.

If the position is shifted from the division image which is intended to be read, owing to the positional precision of the scan mechanism portion in the process of reading the division images, the reading of a correction value from a white reference data storing portion results in that a shifted position data being used in the shading correction process. Therefore, in the above-mentioned reading method, a digital image which is faithful to the image to be read cannot be acquired.

Figure 12:
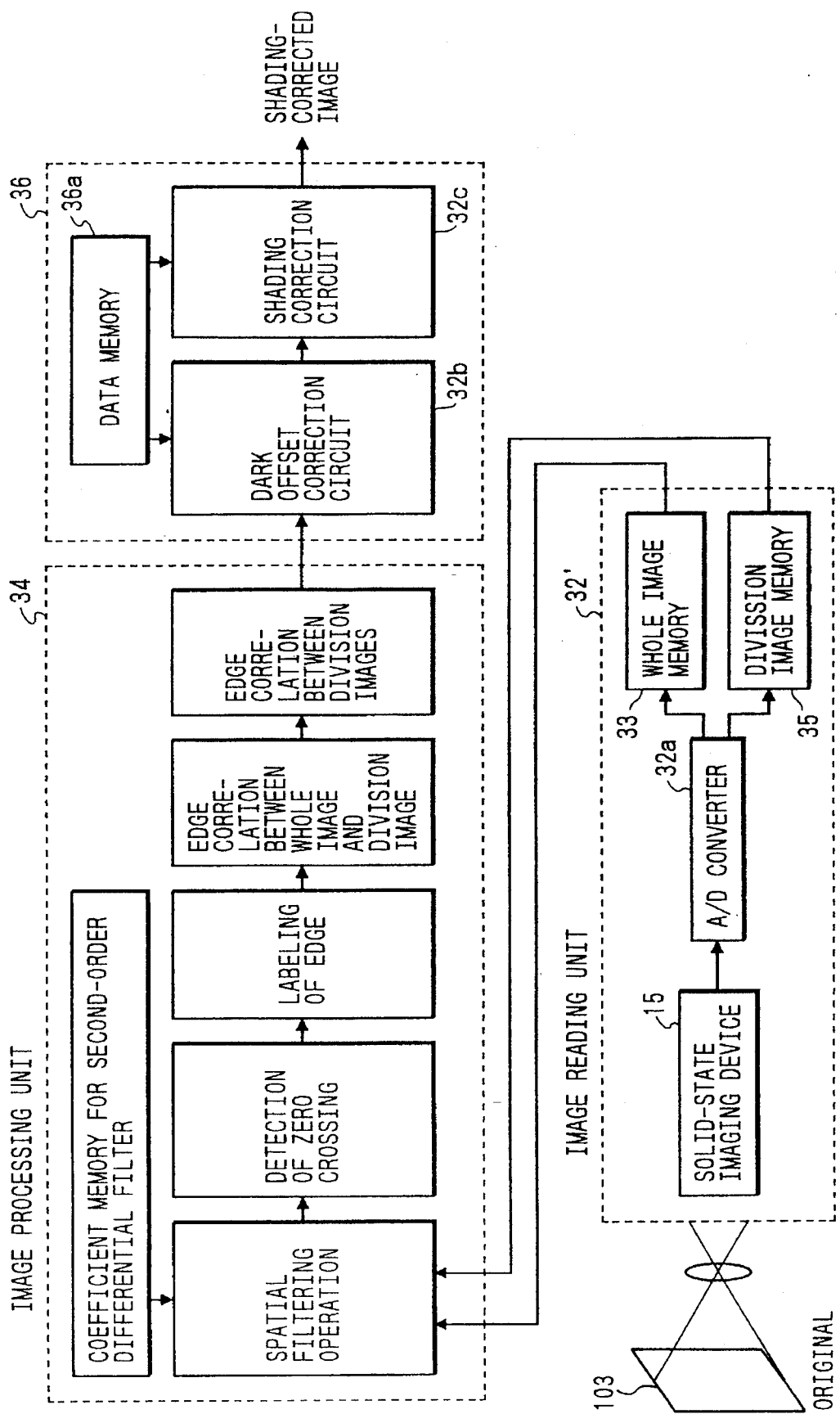
FIG. 12 is a block diagram illustrating a second embodiment of the image reading apparatus of the invention.
Figure 13:
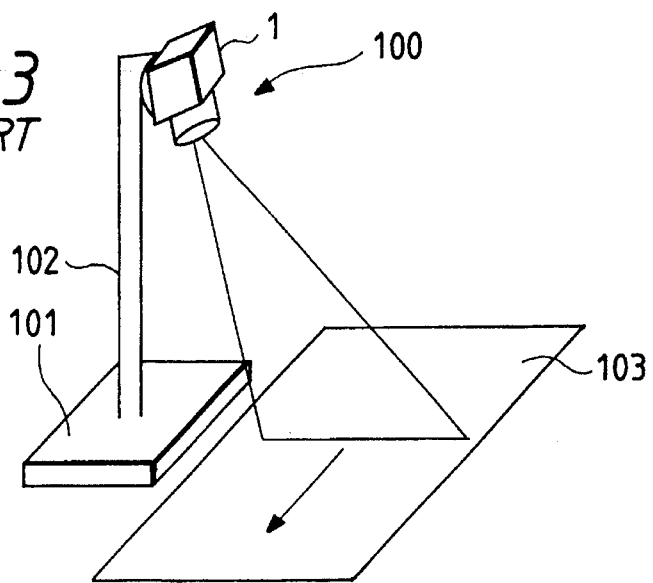
FIG. 13 is a perspective view illustrating the configuration of the whole of a conventional image reading apparatus.
Figure 14:
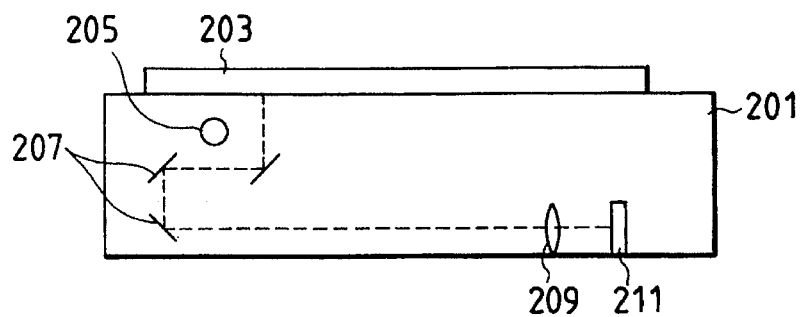
FIG. 14 is a diagram illustrating the configuration of a conventional image reading apparatus.
Figure 15:
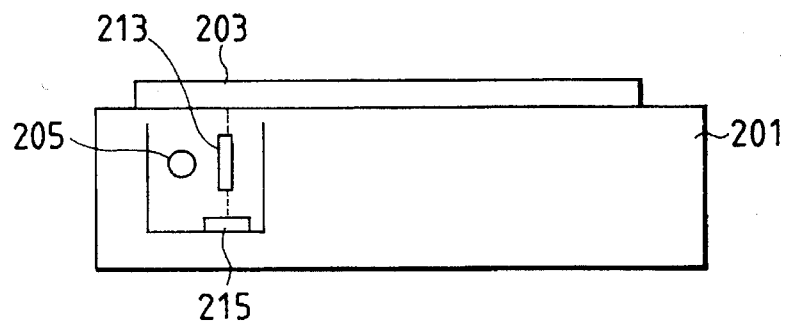
FIG. 15 is a diagram illustrating the configuration of another conventional image reading apparatus.

As a second embodiment of the invention, an image processing apparatus in which a shading correction is performed after the image connecting process is shown in a block diagram of FIG. 12. The main components of the image processing apparatus are the same as those in the block diagram of FIG. 1. Therefore, the different components are mainly described.

An image reading portion 32' performs the first reading process (prescan) and the second reading process (partial scan) to read the whole image and the division images, respectively, in the same manner as in the embodiment of FIG. 1. The obtained image data are stored in a whole image memory 33 and a division image memory 35, respectively.

When the whole image is read in the first reading process, shading data are also read. The shading data are recorded in a white reference data memory 36a of a shading correction portion 36.

For the whole image and the division images, a series of processes, (1) product-sum operation with a spatial filter, (2) detection of zero crossings, and (3) labeling of the connected regions of the edge portions is performed in an image processing unit 34, in the same manner as in the above-described embodiment. Then, the correlations between the division images and the whole image are obtained.

Next, the correlations between adjacent division images are obtained. By the above two-step process, an image connecting process is performed for specifying the positions of the respective division images. Thereafter, the shading correction portion 36 reads out the shading data, which have been stored during the process of reading the whole image, from the white reference data memory. 36a, and performs a shading correction based on the data.

According to the image processing apparatus of the second embodiment, when the whole image is read in the first reading process, the shading data also are read. Then, the shading correction is performed for the images which have been subjected to the connecting process. Therefore, it is possible to use white reference data for the accurate position, so that a digital image which is faithful to the original image can be obtained by correcting the shading nonuniformity due to the intensity nonuniformity of light from the light source, the position of the light source or the like. The embodiment is effective particularly in an image reading apparatus where an associated light source is not provided and only an external light source such as a room fluorescent lamp or the like is used as the light source.

As described in detail, according to the image reading apparatus of the invention, in addition to the second reading process of reading the details of an original, the first reading process of reading the whole of the original is performed. Therefore, the correlations between the division images read in the second reading process and the whole original image can be obtained.

Moreover, when the division images are to be connected, a two-step process is performed, that is, the correlations between the division images and the whole image are obtained, and then the correlations between adjacent division images are obtained. Therefore, the mechanical system which controls the position and direction of the imaging device is not required to have a precise positional accuracy.

The registration with rough accuracy is previously performed when the position of the imaging device is somewhat shifted from the target position due to an error of the mechanical system for controlling the position and direction of the imaging device. Therefore, the connecting of the division images can be completed within a shorter time period because, as compared with the case where the registration with high accuracy is performed from the beginning.

Moreover, since the shading data are read when the whole image is read in the first reading process, the shading nonuniformity due to the intensity nonuniformity of light from the light source, the position of the light source, or the like, can be corrected, such that a digital image, which is faithful to the original image, can be acquired.

Figure 16:
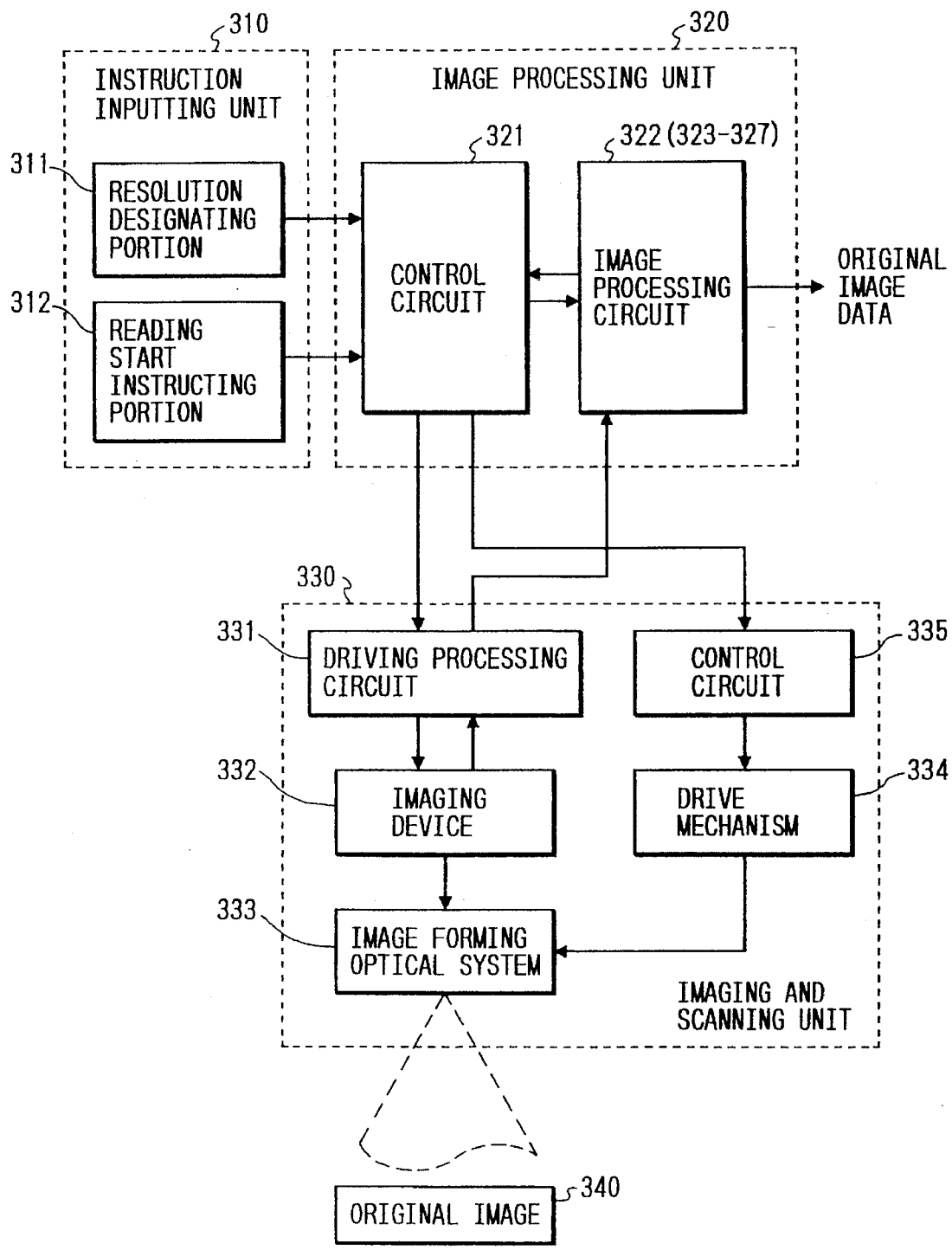
FIG. 16 is a block diagram illustrating a third embodiment of the invention.

FIG. 16 is a block diagram showing the configuration of a third embodiment of the invention. In FIG. 16, an image reading apparatus includes an instruction inputting unit 310, an image processing unit 320, and an imaging and scanning unit 330.

The instruction inputting unit 310 includes a resolution designating portion 311 for designating a desired resolution, and a reading start instructing portion 312. The image processing unit 320 includes a control circuit 321 for controlling the entire image processing unit 320, and an image processing circuit 322 for performing processes of reading an original image in a division manner and connecting the division images which are read.

The image processing circuit 322 includes a density determining circuit 323, a density correcting circuit 324, a distortion correction processing circuit 325, a connecting-sequence determining circuit 326, and an average density calculating circuit 327. The density determining circuit 323 determines a density of each division image. The density correcting circuit 324 corrects the density so that, when the division images are to be connected, each of the division images has a density which is as uniform as possible.

The distortion correction processing circuit 325 omits a distortion correcting process in the process of imaging the original image, when the densities of all the division images are uniform. The connecting-sequence determining circuit 326 determines the connecting sequence when the division images are to be connected in a desired sequence. The average density calculating circuit 327 calculates the average value of densities of the connected regions of the division images.

The imaging and scanning unit 330 includes a driving process circuit 331, an imaging device 332, an image forming optical system 333, a drive mechanism 334, and a control circuit 335. The driving process circuit 331 drives the imaging and scanning unit 330 to freely move in the directions along the X axis and the Y axis for scanning. The imaging device 332 is composed of, for example, an MOS-type, bipolar-type or TFT-type solid-state imaging device for reading an original image. The image forming optical system 333 reads an original image 340 and forms the image on the imaging device 332. The drive mechanism 334 drives the image forming optical system 333 to move in the directions along the X axis and the Y axis for scanning. The control circuit 335 controls the drive mechanism 334.

A desired resolution is designated through the instruction inputting unit 310, and at the same time an instruction to read an original image is given. These two instructions are input into the control circuit 321 of the image processing unit 320. In accordance with the instructions from the instruction inputting unit 310, the control circuit 321 sends control signals to the driving process circuit 331 and control circuit 335 of the image and scanning unit 330.

The image forming optical system 333 is adjusted by the drive mechanism 334 under the control of the control circuit 335, so that the image of the original image 340 is properly formed on the imaging device 332, or so that the zooming quantity is changed. The image data of the original image which are read by the imaging device 332 are fed to the image processing unit 320 at the timing of the control signal from the driving process circuit 331. After prescribed processes are performed by the image processing circuit 322 of the image processing unit 320, the original image data are acquired.

Figure 17:
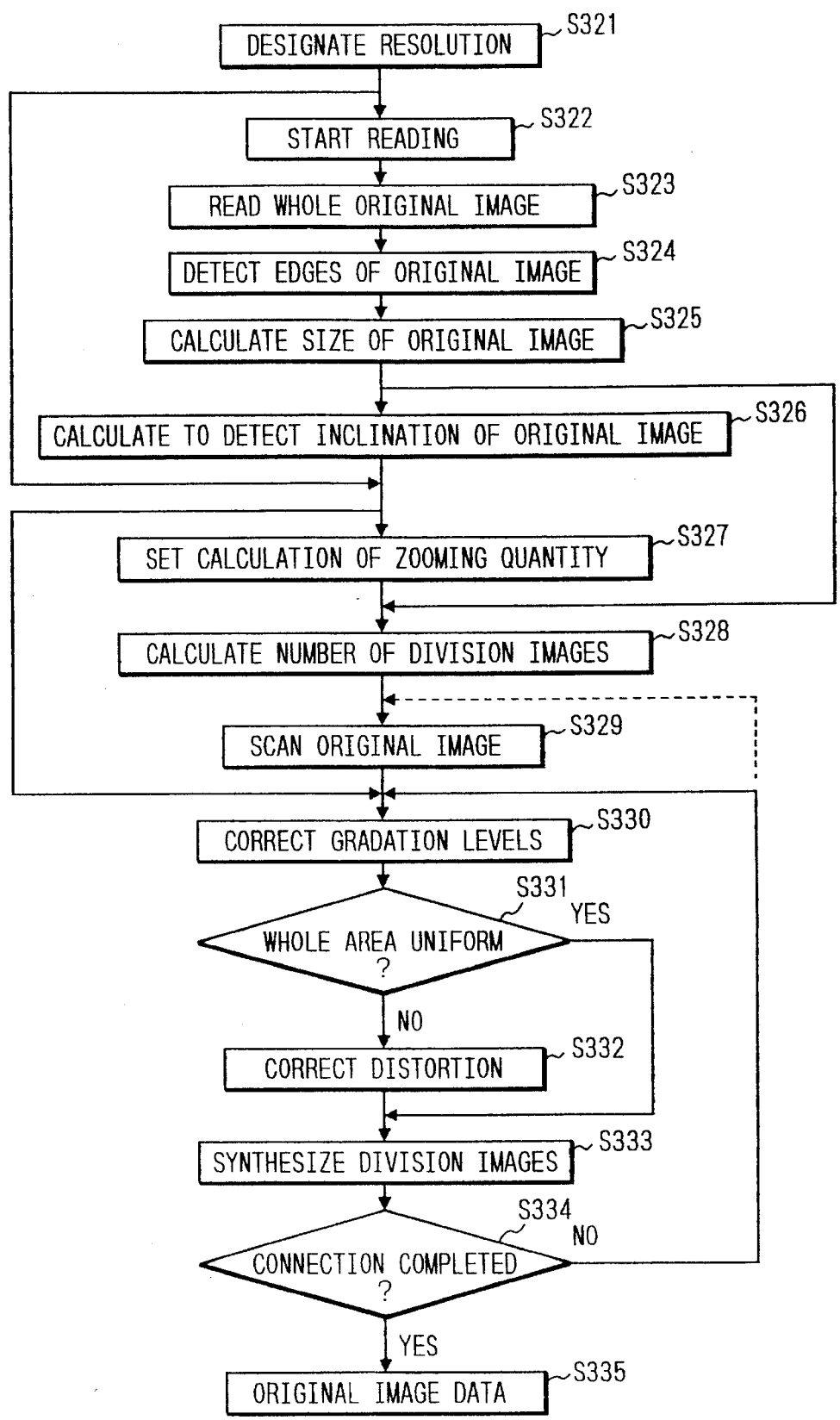
FIG. 17 is a flowchart illustrating the third embodiment of the invention.
Figure 18:
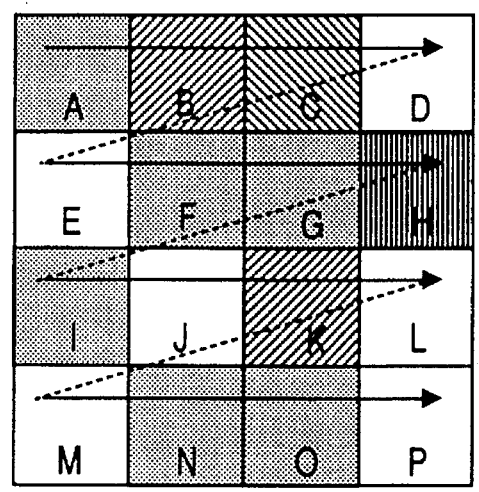
FIG. 18 is a diagram illustrating the connection of division images.

Next, the image processing in the image processing circuit 322 will be described in detail with reference to FIG. 17. FIG. 17 shows a flowchart illustrating the third embodiment of the invention. FIG. 18 is a diagram illustrating the connection of division images.

The desired resolution is designated through the instruction inputting unit 310, and at the same time the reading of the original image 340 is instructed (steps S321 and S322). The imaging and scanning unit 330 performs the process of imaging the whole of the original image 340 in accordance with the above instructions through the instruction inputting unit 310 (step S323). The imaging of the whole image is also referred to as a prescan, and may be done while the zooming quantity is manually changed by the operator watching the display. When the whole of the original image 340 is to be automatically imaged, feature points, e.g., edges of the original image 340 are detected (step S324). The edge detection is done by detecting a contrast between the color of the original and the color of the upper surface of the office desk on which the original is placed. For this reason, when the original image is formed on a white sheet, it is preferable that the color of the upper surface of the desk is not white.

Adjustment of the focal point is performed when the whole of the original image 340 is to be imaged. This focal adjustment allows distance information on the distance between the imaging and scanning unit 330 and the original image 340, and angle information on the angle formed by them, to be obtained. The image processing circuit 322 calculates the size of the original image 340 from the edge of the original image 340 and the distance and angle information (step S325). For example, it is determined whether the size of the original image 340 is A4 or B5. In a case where there is no inclination of the original image 340 and the resolution can be left out of consideration, steps S326 and S327, which are described later, are skipped and the process proceeds to step S328.

The image processing circuit 322 calculates a zooming quantity from the desired resolution designated through the instruction inputting unit 310 and the original image 340, and the setting of the image forming optical system 333 is done based on the calculation result (step S327). Even for the same original image 340, if the location of the original image 340 is changed, the zooming quantity varies. When the size of the original image 340 and the fact that the original image 340 is not inclined are previously known before the process of reading the original image 340, the operation can be started from step S327, by skipping steps S322 through S326. The imaging processing circuit 322 calculates the number of division images of the original image 340, based on the size of the original image 340 and the zooming quantity (step S328).

When the number of the division images of the original image 340 is determined, the size of each division image is accordingly determined. The respective division images are scanned in the sequence of, for example, A, B, . . . O and P as indicated by arrows in FIG. 18, to scan the whole original image (step S329). If the original image 340 can be read as a single image regardless of the resolution, the process can proceed to step S330 by skipping steps S327 to S329. If the original image 340 is not inclined and it is not necessary to divide the whole image, the process proceeds to step S330 by skipping steps S326 to S329.

The image processing circuit 322 corrects the gradation levels of the division images (step S330). The density determining circuit 323 reads a division image to determine whether the whole area of the division image is uniform or not (step S331). If it is determined that the whole area of the division image is white, the output signal of the density determining circuit 323 is all "0" If it is judged that the output signals are all "0", a next process, i.e., a distortion correcting process in step S332 is omitted, and the process proceeds to step S333 where a process of synthesizing the division images is performed.

If the color of the division image is a color other than white, for example, gray, yellow or the like, or if the division image is a background portion in a picture, the same determination as mentioned above can be performed. If it is determined in step S331 that the whole area of the division image is not uniform, i.e., if the output signal from the density determining circuit 323 includes "0" and "1", a the distortion is geometrically corrected by performing the imaging from a oblique upper point (step S332).

Thereafter, the respective division images are connected by the image processing circuit 322 (step S333). The division images are connected in such a manner that portions of a line fit each other utilizing the linearity of the line. The above connecting process is continued until there is no more division image to be connected (step S334). When there is no more division image to be connected, the data of the original image are output under the control of the control circuit 321 of the image processing unit 320.

In the above, step S330 and the following steps are performed after the original image 340 is completely divided. Alternatively, a single image may be divided from the original image 340 and then seeps S330 to S333 are performed. Thereafter, the process may return to step S328 (an arrow mark of broken line in FIG. 17), and this procedure may be repeatedly conducted on all of the division images.

When the original image is read by the above embodiment, as shown in FIG. 18, it is unnecessary to perform the distortion correcting process and the connecting process, for example, on the division images D, E, J, L, M and P which are formed in a white area. Therefore, an image reading apparatus with high processing speed can be provided.

Figure 20:
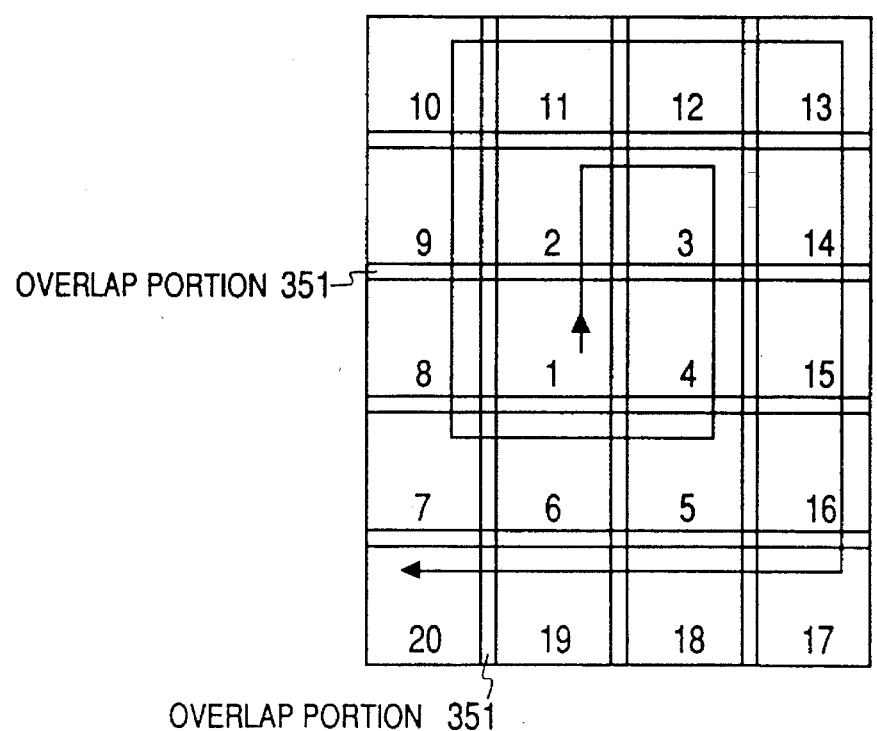
FIG. 20 is a diagram illustrating the connecting process in which division images are connected in the sequence starting from division images in the neighborhood of the center portion.
Figure 19:
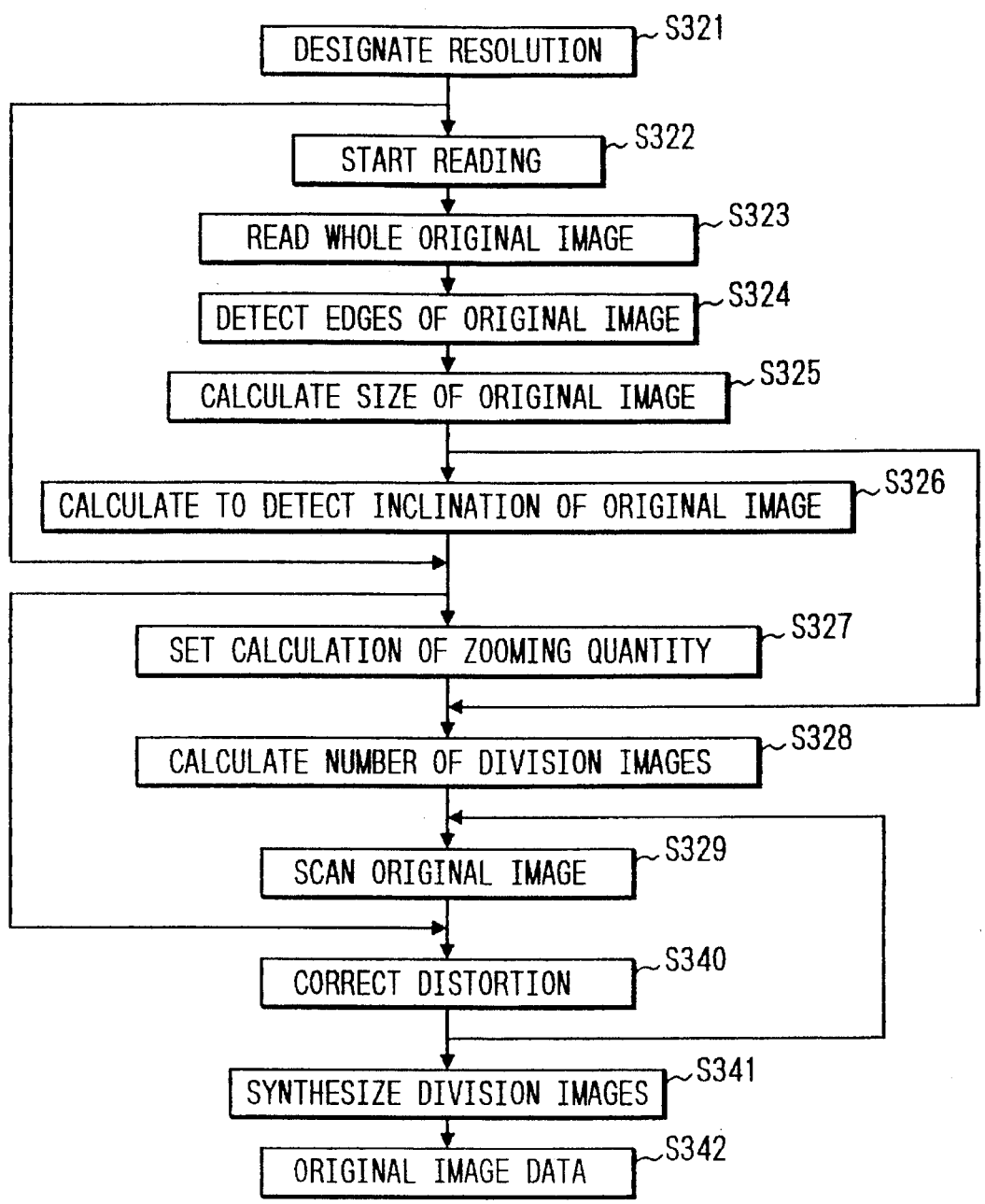
FIG. 19 is a flowchart illustrating a fourth embodiment of the invention.

Next, a fourth embodiment of the invention will be described referring to FIG. 19. FIG. 19 is a flowchart of the connecting process in which division images are connected in the sequence starting from division images in the neighborhood of the center of the original image. FIG. 20 is a diagram illustrating the connecting process in which division images are connected in the sequence starting from division images in the neighborhood of the center of the original image.

In FIG. 19, steps S321 to S329 are identical to those in FIG. 17, and therefore their description is omitted.

The fourth embodiment reflects the fact that images generally gather around the central area of the original image 340. Thus, an imaging and scanning unit 330 performs the imaging of the original image from an oblique upper point. Therefore, a scan angle is formed by the imaging and scanning unit 330 and the original image 340, and the scan angle varies for every division image. In the case where there is any error in the scan angles for the adjacent division images, even if the error is very small, the division images are shifted from each other by several pixels when they are connected.

The correlation in white/black matching in edge portions of an area centered at the connecting point of the adjacent division images is acquired, and a process of connecting the adjacent division images at the best matching position is performed. For this purpose, each of the division images is previously provided with an overlap portion 351 having a size corresponding to several pixels.

Next, step S340 and the following steps in the flowchart of FIG. 19 will be described. The division images which are scanned from an obliquely upper point by the imaging and scanning unit 330 have more distortion as compared with those which are obtained by performing the scan from a directly upper point. The distortion in division images is geometrically corrected (step S340). Adjacent ones of corrected division images are connected to each other.

As described above, in the central area of the image, many lines exist and hence feature points can be easily extracted. This means that the connecting process for the central area can be easily performed. On the other hand, in the peripheral area of the image, there may be no image in many cases. This means that it is difficult to perform the connecting process in the peripheral area. In the case where adjacent ones of division images including deviation caused by an error in the distortion correcting process are to be connected, even when the deviation is very small, the degree of deviation is gradually increased by subsequently connecting such division images.

Therefore, unlike the prior art in which the connecting process is started from division images in the peripheral area of the original image, the connecting process in this embodiment is started from division images in the central area of the original image. For example, the process of connecting division images spirally proceeds in such a sequence from 1 to 20 as indicated by a solid arrow in FIG. 20. Alternatively, in FIG. 20, the process of connecting division images may proceed in the sequence of 2, 3, 1, 4, 6 and 5 and then proceed to division images in the peripheral area to circulate therein. If the important portions of an image are biased, or if the important portions of an image are dispersed, these portions may be connected preferentially. The sequence of connecting the division images may be predetermined in the form of a program stored in the connecting-sequence determining circuit 326 of the image processing unit 320, or determined by an instruction through the instruction inputting unit 310.

As described above, in this embodiment, important portions of an image are preferentially connected, and the distortion in unimportant portions of the image can be tolerated, whereby the image quality is improved as a whole.

Figure 21:
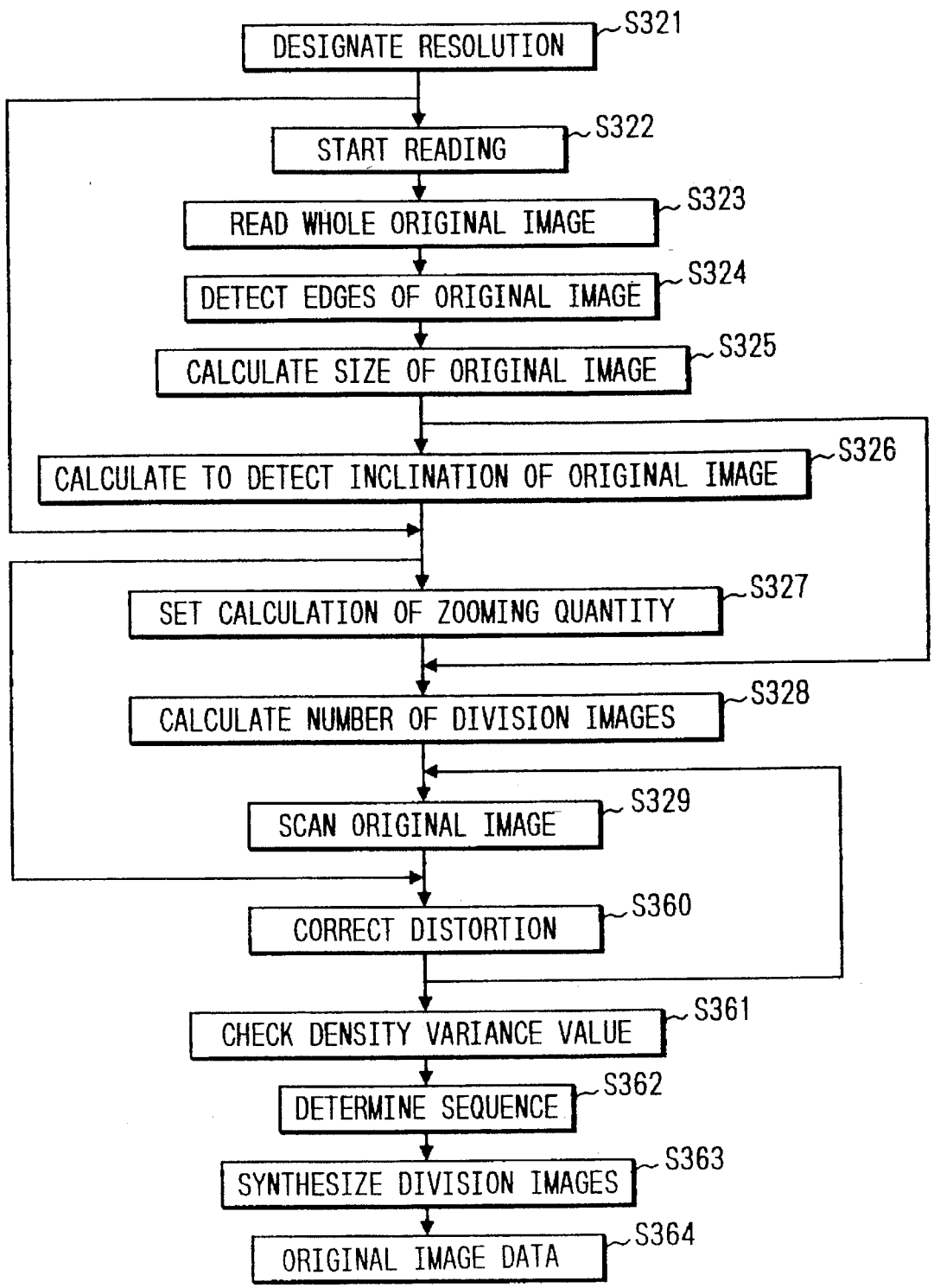
FIG. 21 is a flowchart illustrating a fifth embodiment of the invention.
Figure 22:
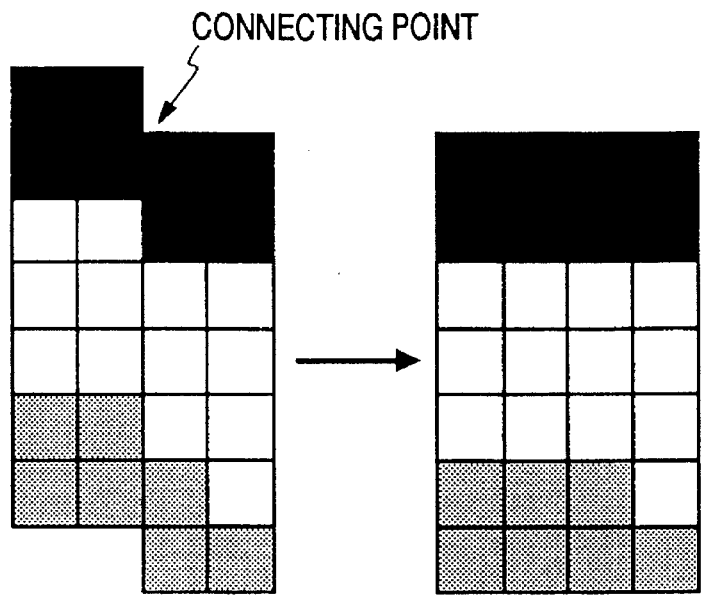
FIG. 22 is a diagram illustrating division images of high density which have not yet been subjected to the connecting process and those which have been subjected to the connecting process.
Figure 23:
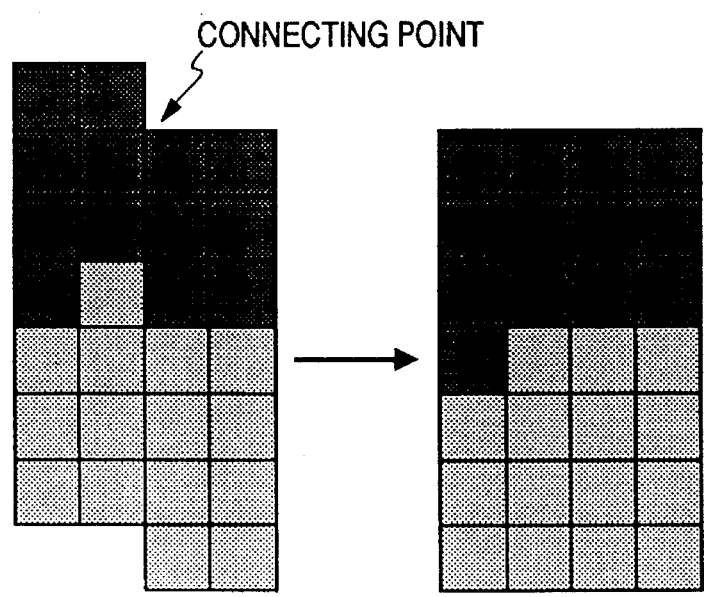
FIG. 23 is a diagram illustrating division images of low density which have not yet been subjected to the connecting process and those which have been subjected to the connecting process.

Referring to FIGS. 21 to 23, a fifth embodiment of the invention will be described. FIG. 21 is a flowchart of a process of connecting division images which is performed in the sequence of the density variance value. FIG. 22 is a diagram illustrating division images of high density which have not yet been subjected to the connecting process and those which have been subjected to the connecting process. FIG. 23 is a diagram illustrating division images to low density which have not yet been subjected to the connecting process and those which have been subjected to the connecting process.

In FIG. 21, steps S321 to S329 are the same as those in FIGS. 17 and 19, and therefore their description is omitted.

In general, image portions, which have large density variation, can be connected with a reduced number of errors, while peripheral portions in which white is dominant are difficult to be connected. An imaging and scanning unit 330 of this embodiment performs the imaging of the original image from an oblique upper point. Accordingly, the imaging and scanning unit 330 forms a scan angle with respect to the original image 340, and the scan angle varies for every division image. Therefore, if there is any distortion in the adjacent division images when they are connected, the distortion tends to increase every time division images are sequentially connected.

When the variation in density of the synthesized region of division images is large, the feature points can be easily extracted, so that the division images can be easily connected. When the variation in density of the synthesized region of division images is small, the extraction of the feature points tends to be difficult. If the variation in density of the connected regions is small, moreover, the distortion, if any, is not noticeable.

Next, the flowchart of FIG. 21 is described starting from step S360. The division images which are scanned by the imaging and scanning unit 330 from an oblique upper point in the same manner as in step S340 of FIG. 19 have more distortion as compared with division images which are scanned from a direct upper point. The distortion of the division images is geometrically corrected (step S360). When the division images are to be connected to each other, the density variance value of the connected regions is checked (step S361). The sequence of the density variance value of the division images is determined by calculation. The sequence determined by this calculation is used as the sequence of connecting the division images (step S362). Thereafter, the division images are connected in this connecting sequence (step S363) to generate original image data (step S364).

For example, as shown in FIG. 22, if deviation of the connected images occurs, and if the area along the edge of a connected region has a large density variance value, the deviation is very noticeable. Therefore, the connecting process is started from this area. As shown in FIG. 23, in the area having a small density variance value, the deviation of the connected images, if any, can be tolerated. Moreover, if the density variance value is large, the degree of error caused in the process of matching white and black portions at the edge portions of the adjacent regions can be reduced, whereby the influence of the error on the subsequent connection processes can be made small.

Figure 24:
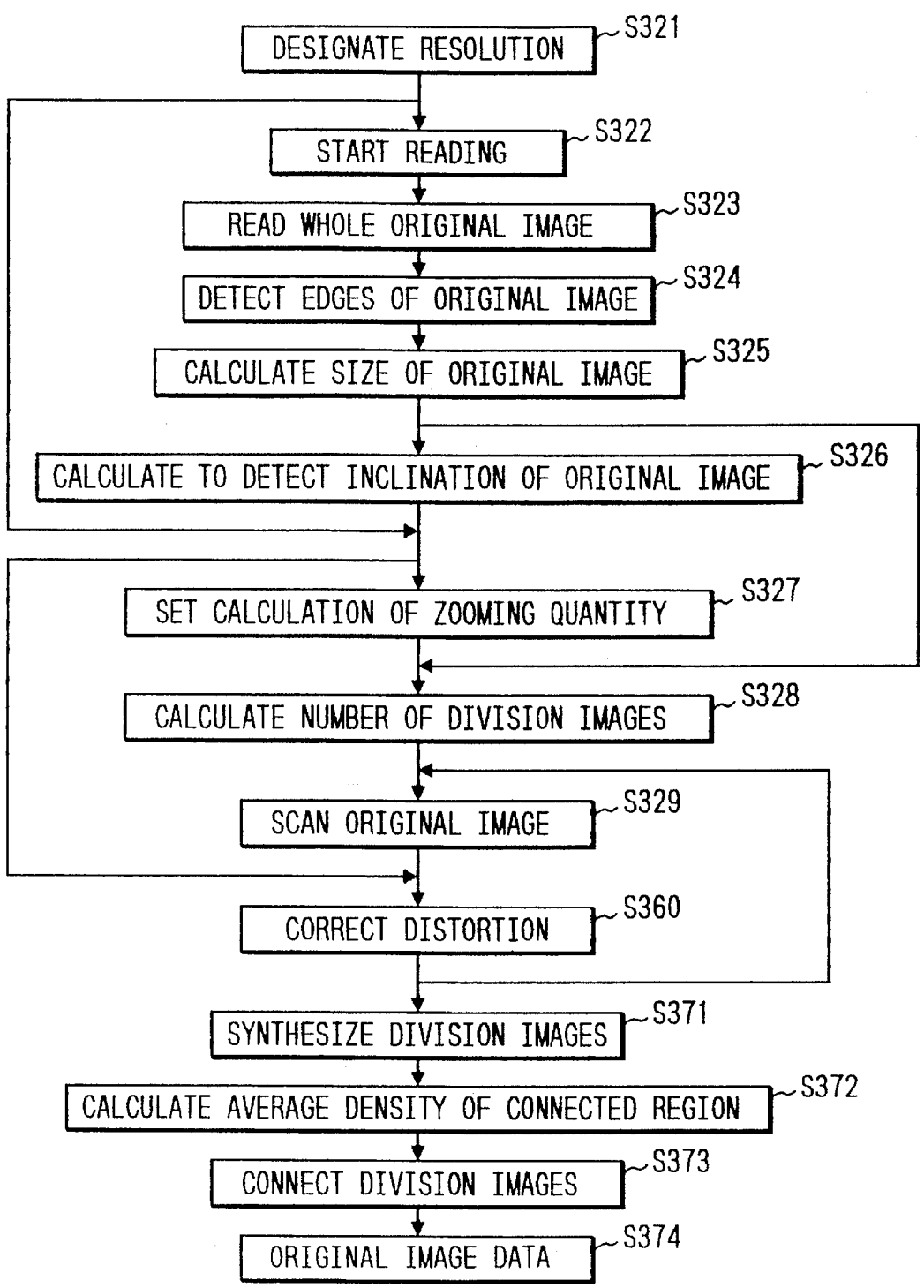
FIG. 24 is a flowchart illustrating a sixth embodiment of the invention.
Figure 25A:
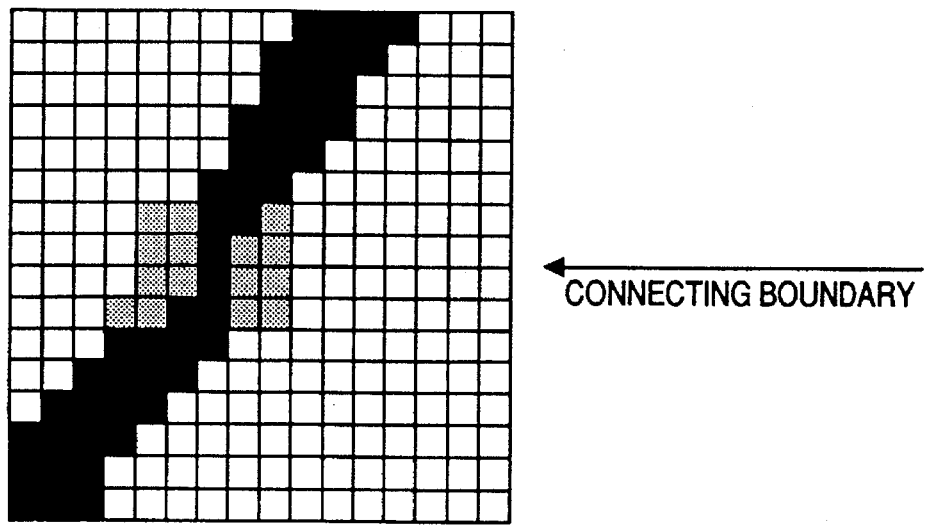
FIGS. 25(a) to 25(c) are diagrams illustrating connected regions which are subjected to the shading.
Figure 25B:
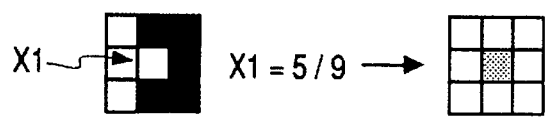
Figure 25C:
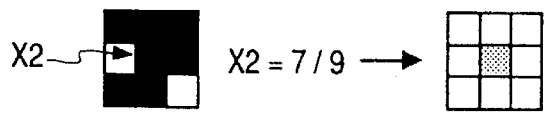

A sixth embodiment of the present invention will be described with reference to FIGS. 24 and 25(a) to 25(c). FIG. 24 is a flowchart for performing a process of shading the connected region of division images. FIGS 25(a) to 25(c) are diagrams illustrating connected regions which have been subjected to the shading process. In FIG. 24, steps S321 to S329 and step S360 are the same as those in FIGS. 17, 19 and 21, and therefore their description is omitted.

In the sixth embodiment, after the distortion correction of division images to be connected with each other is performed, the density determining circuit 323 of the image processing unit 320 (see FIG. 16) extracts a specific pixel in the connected region of the division images, and the densities of pixels in the neighborhood of the specific pixel are determined (step S371). For example, a specific pixel "XI" and pixels in the neighborhood of the specific pixel "XI" or eight pixels which surround the "XI" pixel, i.e., nine pixels in total are extracted. The densities of the respective pixels are determined. When an image shown in FIG. 25(b) is a character, for example, the character portion is black and the remaining portion is white, so that among the pixels in the neighborhood of the specific pixel "Xi", five pixels are black, and four pixels are white.

The average density calculating circuit 327 of the image processing circuit 320 calculates the average density of the connected region from the densities of the respective pixels (step S372). Thereafter, the division images are connected based on the averaged density (step S373). For example, the specific pixel "XI" in FIG. 25(b) is X1=5/9 judging from the number of the black pixels in the neighborhood thereof, so that an image signal of 5/9 density of a black pixel is output. In the neighborhood of the specific pixel "X2" shown in FIG. 25(c), there are seven black pixels, and therefore its average density is calculated to be X2=7/9 in the same manner as described above, and an image signal of 7/9 density of black pixels is output.

The above process is performed for each of the specific pixels of the connected regions of all of the division images, and original image data of the connected regions are output.

As a result, for example as shown in FIG. 25(a), the connected regions of the division images are output as the average density in the neighborhood of each pixel. Accordingly, there is no stepped portion in the image and a shading image is obtained. Therefore, in the connected regions of the division images, an image, which is more faithful than one in which only the division images are connected, can be obtained.

The embodiment applied to the process of a character image has been described. Alternatively, an image having gradation can be improved in its image quality by performing the same shading process as described above.

Figure 26:
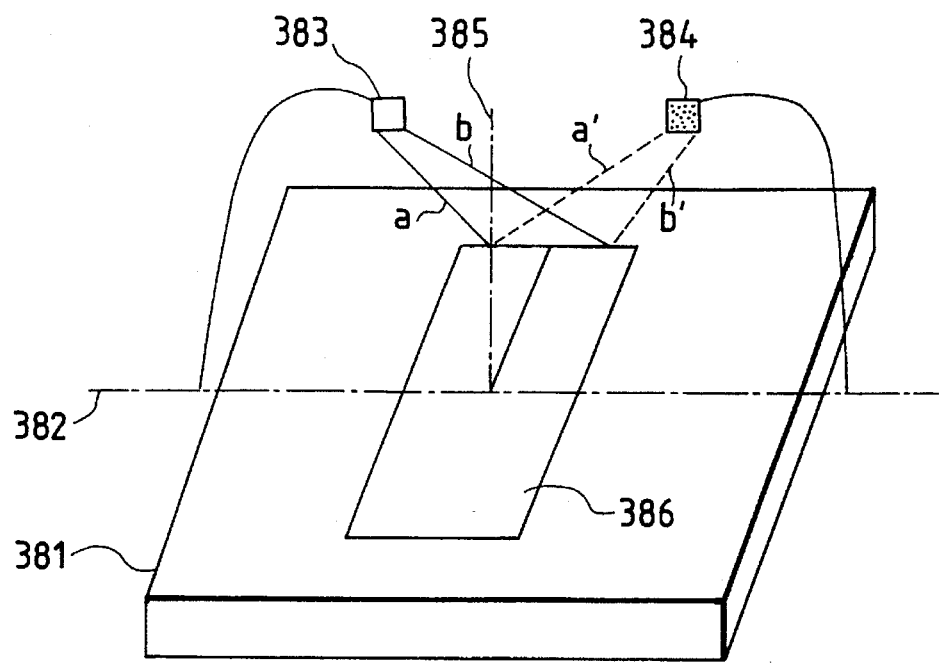
FIG. 26 is a diagram illustrating a light source used in the image reading apparatus which is a seventh embodiment of the invention.

A seventh embodiment of the invention will be described with reference to FIG. 26. FIG. 26 is a diagram illustrating a light source used in the image reading apparatus which is the seventh embodiment of the invention.

In FIG. 26, a base 381 is a flat, unspecified body, such as an office desk. At one end of the center line 382 of the base 381, an imaging and scanning unit 383 is disposed. At the other end of the center line 382, a diffused lighting unit 384 is located. These units are positioned in a symmetrical manner. An original image 386 is placed in the middle of a distance between the imaging and scanning unit 383 and the diffused lighting unit 384.

In other words, the diffused lighting unit 384 is placed on a line elongating in a direction that is symmetrical to the direction in which the center of the original image 386 is seen from the imaging and scanning unit 383, with respect to a perpendicular line 395 at the center of the original image 386. The diffused lighting unit 384 may, for example, be a point light source. The main optical axis of the diffused lighting unit 384 is directed to the center of the set position of the original image 386. The diffused lighting unit 384 includes a diffusion plate for sufficiently diffusing light in order to avoid problems caused by regular reflection light.

In the above-mentioned arrangement of the imaging and scanning unit 383 and the diffused lighting unit 384, a sum of distance a, from the imaging and scanning unit 383 to a portion to be read which is close to the imaging and scanning unit 383, and distance a', from the portion to be read to the diffused lighting unit 384, is substantially equal to a sum of distance b, from the imaging and scanning unit 383 to a portion to be read which is far from the imaging and scanning unit 383, and distance b', from the portion to be read to the diffused lighting unit 384. Therefore, the imaging and scanning unit 383 and the diffused lighting unit 384 are disposed as shown in FIG. 26 so that the illumination distribution which is seen from the imaging and scanning unit 383 is uniform over the entire surface of the original image 386. In the connecting process for a plurality of division images, it is unnecessary to adjust the features along the gradation direction of the division images, whereby the processing burden is reduced.

According to the invention, the whole surface of each division image is checked to determine whether the image density is uniform. For the division image in which the whole surface is uniform in density, the distortion correcting process is not performed. Therefore, the processing burden of the image reading apparatus can be reduced and the processing time period can be shortened.

The connecting process of the division images is started from the central area where a relatively large number of division images exist, so that the deviation in the central area of the image is little and is not noticeable.

Moreover, when the process of connecting division images is to be performed, division images, which have large density variance values and which have noticeable deviation in the connected region is noticeable are preferentially connected. Division images which have small density variance values and which lacks noticeable deviation in the connected region, are connected later, whereby the image quality is improved.

Furthermore, the average density in the neighborhood of the respective pixels in the connected region is calculated, and the image data are output based on the average density. Even if there is a step in the boundary portion of the connected region of the division images, therefore, the step in the portion is not noticeable, and a high-quality image can be obtained.

Figure 27:
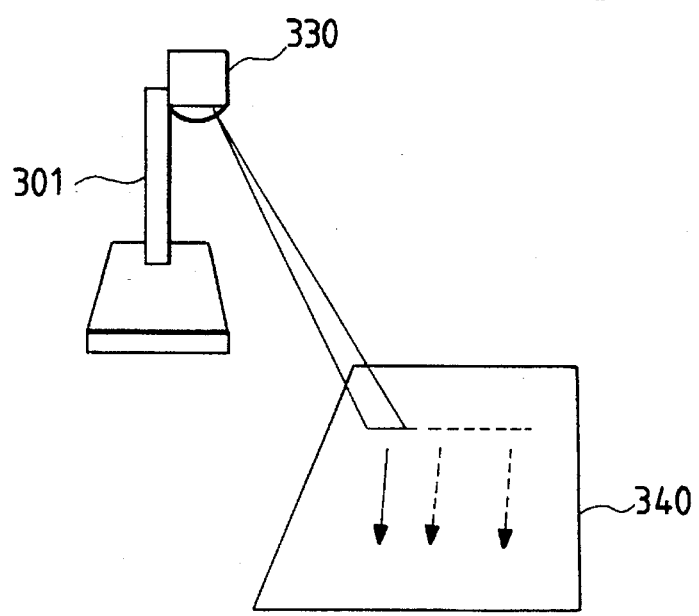
FIG. 27 is a perspective view showing an external appearance of an imaging and scanning unit of the image reading apparatus of an eighth embodiment of the invention and illustrating the concept of a division scan.
Figure 28:
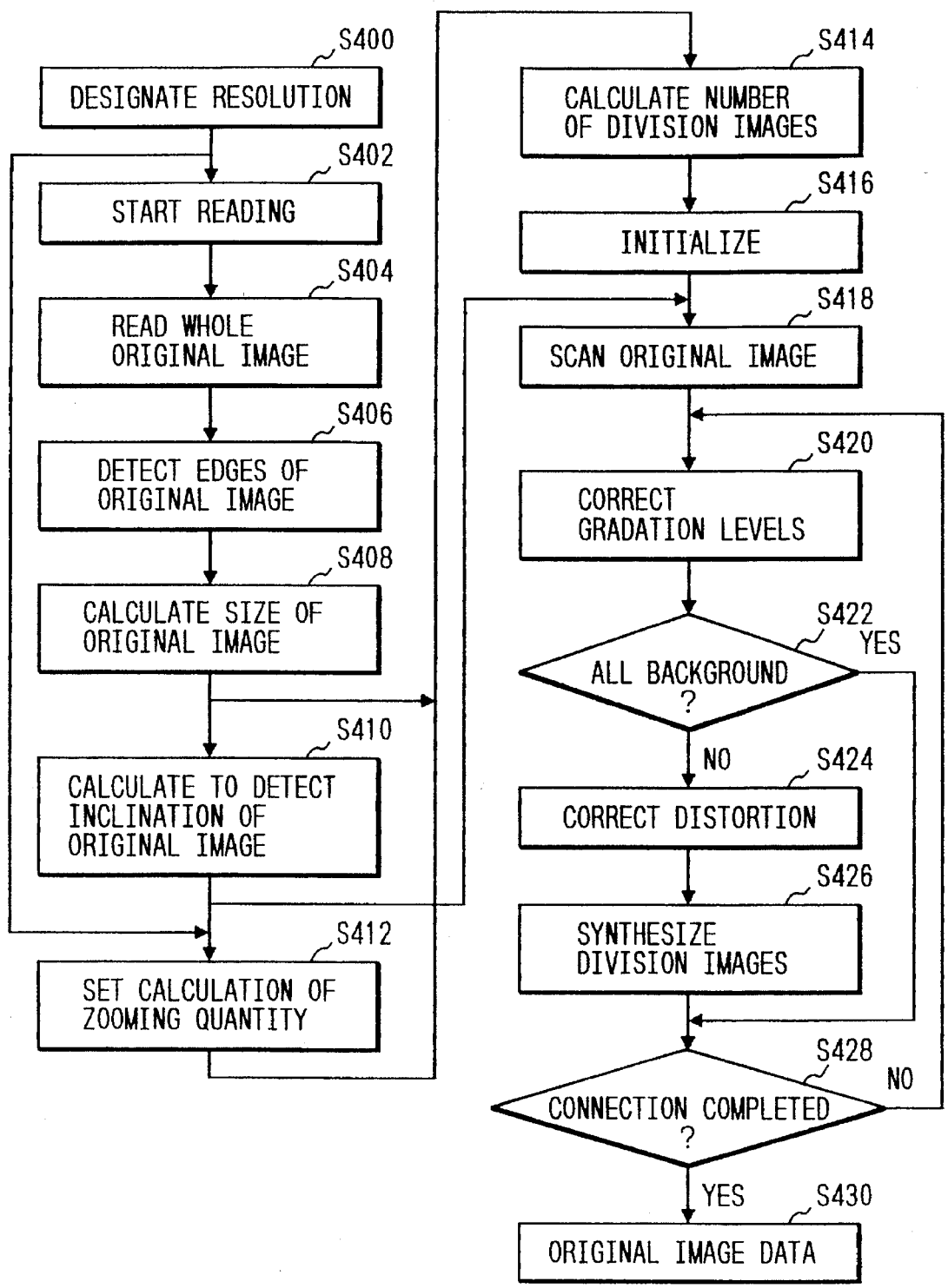
FIG. 28 is a flowchart illustrating the operation of the whole of the image reading apparatus.
Figure 29:
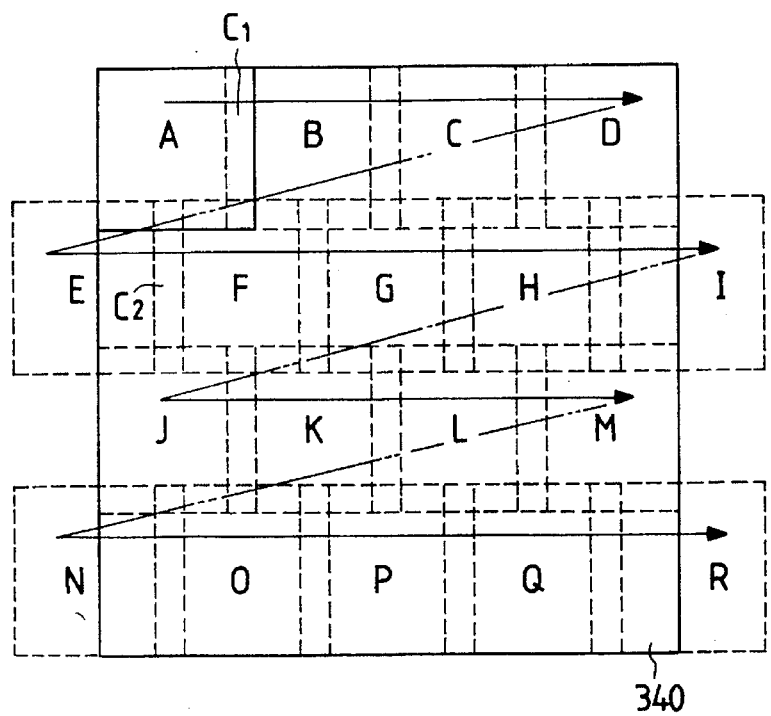
FIG. 29 is a diagram illustrating the division scan operation in the image reading apparatus.
Figure 30:
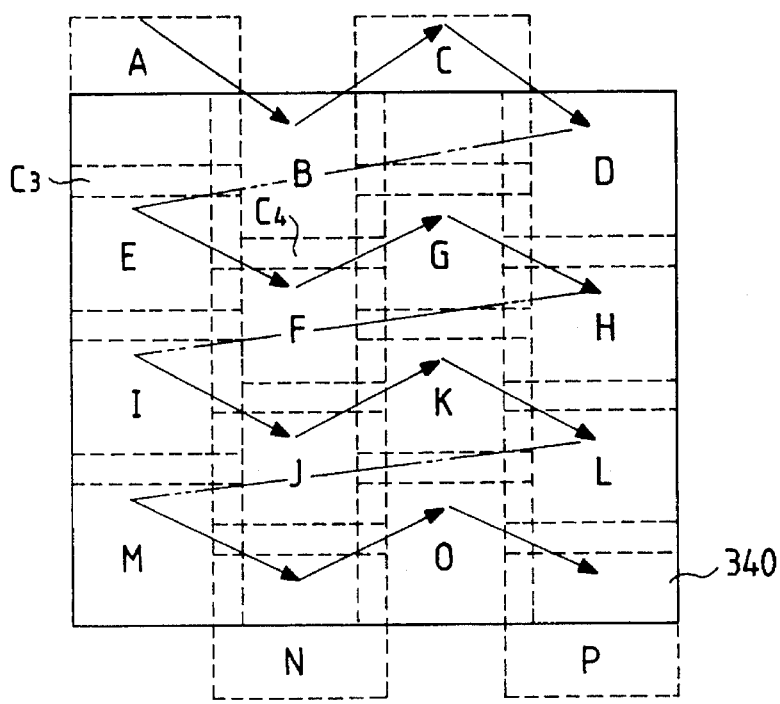
FIG. 30 is a diagram illustrating another example of the division scan in the image reading apparatus.

Hereinafter, referring to FIG. 16 which has been described above and FIGS. 27 to 30, an eighth embodiment of the invention will be described. FIG. 27 is a perspective view showing an external appearance of an imaging and scanning unit of the image reading apparatus and illustrating the concept of a division scan. FIG. 28 is a flowchart illustrating the operation of the whole of the image reading apparatus. FIG. 29 is a diagram illustrating the division scan operation in the image reading apparatus. FIG. 30 is a diagram illustrating another example of the division scan in the image reading apparatus. The structure of the image reading apparatus of the eighth embodiment is the same as that shown in FIG. 16, and therefore the description of the structure is omitted herein.

First, the operation of the schematically illustrated image reading apparatus will be described. A desired resolution and an instruction to start an image reading are input by the user through an instruction inputting unit 310. The resolution and reading start instruction signals are input into a control circuit 321. The control circuit 321 then outputs control signals to a driving process circuit 331 and a control circuit 335 of an imaging and scanning unit 330, respectively.

The driving process circuit 331 operates a solid-state imaging device 332 at a predetermined timing in accordance with the control signal supplied from the control circuit 321. On the other hand, the control circuit 321 controls the operation timing of a drive mechanism 334 in accordance with the input control signal. As a result, the solid-state imaging device 332 and an image forming optical system 333 are oriented in desired directions by the drive mechanism 334.

By the above operation of the imaging and scanning unit 330, the original 340 is divisionally scanned in a manner which is described below, so as to perform the imaging operation on the image on an original 340. The imaged division image data are fed to an image processing unit 320 via the driving process circuit 331 from the solid-state imaging device 332. In the image processing unit 320, a synthesizing process is performed on the data, so as to obtain desired image data.

FIG. 28 shows a flowchart illustrating the flow of the series of operations in the image reading apparatus. Hereinafter, the operations will be described with reference to FIG. 28.

First, in step S400, a resolution is designated. Specifically, a desired resolution is input by the operation of the user through the instruction inputting unit 310. At the same time as the resolution designation, the reading of the original 340 is started (step S402).

Then, the image processing for the whole image of the original 340 (an operation which is called "prescan") is performed by the imaging and scanning unit 330 (step S404). This whole imaging is automatically performed, and simultaneously the edge detection of the original 340 is performed (step S406). The edge is detected, for example, by detecting a contrast between the original 340 and a surface on which the original 340 is placed (for example, the upper surface of a desk, and a black sheet).

In step S408, the size of the original 340 is calculated. In the series process for whole imaging which is performed in step S402 and the following steps, the adjustment of focal point is performed (this step is not shown in the flowchart). Based on the distance and angle information with respect to the image to be read on the original 340 and the imaging and scanning unit 330, the size of the original 340 is determined (for example, it is determined whether the size is A4, B5 or the like).

In step S410, the inclination of the original 340 is detected. The term "inclination" in this context means the inclination of the original 340 with respect to the vertical direction of a screen in the case that the read image of the original 340 is displayed on the screen. If it is previously known that the original 340 is not inclined, and the resolution can be left out of consideration, steps S410 and S412 which are described below may be skipped, so that the process proceeds directly to step S414. If the size of the original 340 and the inclination degree of the original 340 are previously known, the process may directly proceed to step S412 which is described below, while skipping steps S402 through S410.

In step S412, a zooming quantity is calculated based on the desired resolution which is previously set through the instruction inputting unit 310 and the image of the original 340 which is currently obtained, and the image forming optical system 333 of the imaging and scanning unit 330 is set. Following this, the process proceeds to step S414 where the number of division images for divisionally scanning the original 340 is calculated based on the calculated size of the original 340 and the calculated zooming quantity.

In step S416, prior to the start of the division scan, necessary initialization is performed on both the software and hardware. In step S418, then, the division scan is performed for the calculated number of division images of the original 340. After completing the scan, the process advances to step S420 where the gradation of each division image is corrected.

In step S422, it is judged whether all the images obtained by the division scan constitute a background i.e., it is judged whether the images are uniform in density. If it is judged to be uniform (YES), the process proceeds to step S428. If it is judged not to be uniform (NO), the process proceeds to step S424.

In step S424, a distortion correcting process is performed for geometrically correcting the distortion of the division image caused by imaging the original 340 obliquely from above. Then, the process advances to step S426 where a process of connecting the division images is performed. The connecting process is continued until it is determined in step S428 that the connecting process is completed. After completing the connecting process, the image data are output from the image processing circuit 322 as the original image, and displayed on a display apparatus which is not shown (step S430).

Next, among the operations of this apparatus described above, the division scan (the process of step S418 in FIG. 28) is specifically described with reference to FIG. 29.

In a division scan method shown in FIG. 29, the original is divided into lattice-like portions, and the scan is performed on the lattice-like portions in a zigzag manner. In other words, assuming that the original is within the range of a substantially square frame indicated by a solid line in FIG. 29, and that the original is divided into four columns in a lateral direction, the scan is first performed from the left end to the right end on the first row, so as to obtain four division images A, B, C and D.

After obtaining these four division images, the imaging and scanning unit 330 is returned to the left side of the original 340 and the direction of the imaging and scanning unit 330 is changed so as to point to the immediately lower row. In the scan for the second row, a division range (an imaging range which can simultaneously be taken by the solid-state imaging device 332 of the imaging and scanning unit 330, i.e., one of substantially square ranges labeled with alphabetic characters and indicated by broken lines in FIG. 29) is shifted to the left, so that the first division image E is positioned in such a manner that a substantially half area thereof is within the original 340 and the other half area is out of the original 340. The division scan progresses in the right direction. As a result, at the right end of the original 340, the solid-state imaging device 332 operates in the same manner as described for the left end, i.e., a region having an area within the original 340 is taken as a half area and an area out of the original 340 is taken as the other half area (in FIG. 29, a range of the division image labeled I). Regarding the second row, five division images E, F, G, H and I are produced.

Thereafter, a scan process, similar to that for the first and second rows, is repeated so as to scan the third row (a portion including division images J, K, L and M) and the fourth row (a portion including division images N, O, P, Q and R).

The division images obtained by the above division scan are fed to the image processing circuit 322 of the image processing unit 320 via the imaging and scanning unit 330, so that the synthesizing process of the division images is performed. Specifically, among a plurality of division images obtained by the above scan process, the portions which are out of the original 340 (the substantial left halves of the division images E and N and the substantial right halves of the division images I and R) are not regarded as the objects of image synthesis. The image signals related to these portions are thus discarded. Each of the division images is connected with division images surrounding the division image so that their periphery portions overlap each other. Thus, an original image (corresponding to the frame indicated by solid line in FIG. 29) is produced by synthesizing a plurality of division images.

Unlike the prior art, the connected regions in the lateral direction (a direction along a line elongating from right to left of the sheet in FIG. 29) of the original image (e.g., a portion labeled $c_1$ in FIG. 29) are distributed alternately or in a so-called zigzag manner without linking with the connected regions in the vertical direction (a direction along a line elongating from top to bottom of the sheet in FIG. 29). According to the above-described scan procedure, the respective connected regions are shifted in the lateral direction in the same manner as, for example, the connected regions $c_1$ and $c_2$, so as not to link with each other, unlike the prior art. Therefore, there is no possibility that the connected regions appear in such a manner that they can be noticed as noises over substantially all of the length in the vertical direction of the original image as finally displayed.

The above-described division scan is performed by inputting control signals as instruction signals into the driving process circuit 331 and the control circuit 335 of the imaging and scanning unit 330 from the control circuit 321. The instruction signals instruct, for example, the imaging and scanning unit. 330 to move so that the solid-state imaging device 332 can take the division image A of the original 340 and then move to the left. Thereafter, the division scan is performed by sending the instruction signals to the driving process circuit 331 and the control circuit 335 of the imaging and scanning unit 330 from the control circuit 321, based on the series of procedures for the above-described division scan.

According to this embodiment, in the division scan, the division images are scanned by shifting in the lateral direction, the division images which are vertically adjacent. As a result, there is no possibility that the connected regions of the division images appear as stripes over the overall length in the vertical direction of the original image which is obtained by synthesizing the division images, whereby the image quality is improved.

FIG. 30 is a diagram illustrating another example of the division scan system. The system is described below with reference to this figure.

In this system, the division scan in the lateral direction (the direction along a line elongating from right to left of the sheet of FIG. 30) of the original 340 is performed in a zigzag manner. Specifically, an area indicated by a solid line in this figure is first assumed to be a range of the original. The first division image to be read is the upper left one of the original 340, in the same manner as in the division scan described in conjunction with FIG. 29.

However, the imaging and scanning unit 330 is set so as to take the division image A in which a substantial half thereof is within the original 340 and the other half is out of the original 340. After reading the division image A, the imaging and scanning unit 330 is moved in the right and downward direction with respect to the division image A so as to take the division image B. After reading the division image B, the division image C, which is positioned in the right and upward direction with respect to the division image B, is taken. The position of the division image C is at substantially the same level in the lateral direction (a direction along a line elongating from right to left of the sheet in FIG. 30) as the division image A. After reading the division image C, the imaging and scanning unit 330 is moved downward to the same level in the lateral direction as the division image B to read the division image D. Thus, the division scan for the upper portion of the original 340 in the lateral direction is completed.

Then, the imaging and scanning unit 330 is moved to point to the division image E which is positioned beneath the division image A. The scan is performed in the zigzag manner in the right direction of the original 340 in the same scan procedure as described above, so as to obtain the division images E to H. Thereafter, the zigzag division scan is repeated in the same manner. The division scan is completed when the division image P is obtained.

The division images which are obtained by the above series of division scans are fed to the image processing circuit 322. In the same manner described for the above-mentioned example, the excess portions out of the original image, i.e., the substantial upper halves of the division images A and C and the substantial lower halves of the division images N and P in the example of FIG. 30, are deleted. The original image is produced by synthesizing the division images. As a result, the connected regions of the division images which are adjacent vertically (in the direction along a line elongating from top to bottom of the sheet in FIG. 30) do not continue in the lateral direction. For example, in FIG. 30, the connected region $c_3$ of the division images A and E and the connected region $c_4$ of the division images B and F do not continue in the lateral direction. The connected region $c_4$ of the division images B and F is downward shifted from the connected region $c_3$ of the division images A and E by about half of the vertical length of one division image. Therefore, there is no possibility that the connected regions appear as stripes on the screen over the overall length in the lateral direction.

In this embodiment, the division images are discontinued at the same level in the lateral direction by divisionally scanning the original in the zigzag manner. Therefore, there is no possibility that the connected regions of the division images which are vertically adjacent appear as stripes substantially over the overall length in the lateral direction of the original image, whereby the image quality is improved.

In the above embodiments, the control circuit 321 controls either one of the division scans shown in FIGS. 29 and 30. Alternatively, for example, one of the division scans may be selected manually or in other ways.

As described above, according to the invention, the original is divisionally scanned based on the predetermined geometrical arrangement of the division images. Therefore, by appropriately setting the geometrical arrangement of the division images, the phenomenon observed in the prior art that the connected regions of the division images appear as stripe-like noises over the overall length in the vertical and lateral directions of the original image can be avoided, whereby the image quality can be improved.

Figure 31:
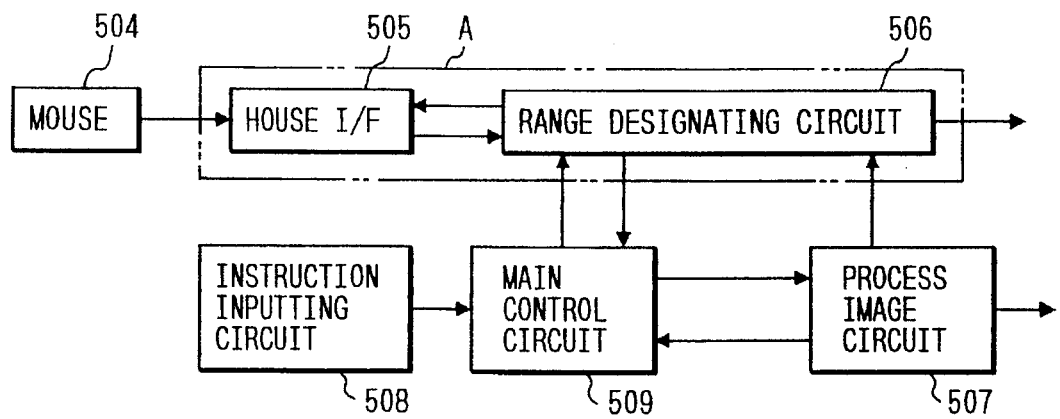
FIG. 31 is a block diagram illustrating the configuration of the main portion of the image reading apparatus which is a ninth embodiment of the invention.
Figure 32:
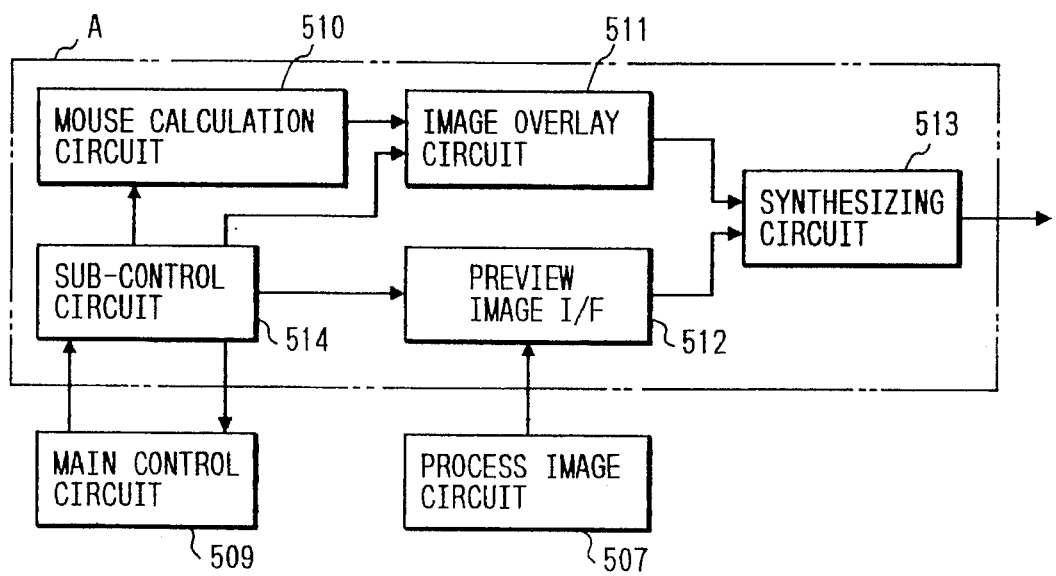
FIG. 32 is a block diagram illustrating a specific configuration of the portion which is enclosed by the two-dot chain line in FIG. 31.
Figure 33A:
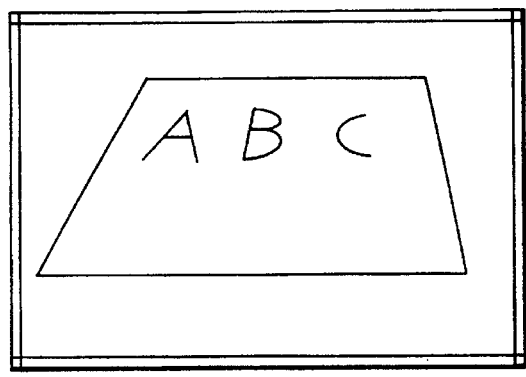
FIG. 33(a) is a diagram showing the state where a bird's-eye image is displayed.
Figure 33B:
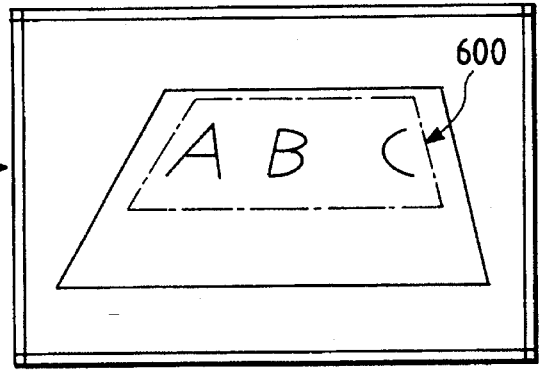
FIG. 33(b) is a diagram showing the state where a frame line to be used in the designation of the reading range is superimposed on the bird's-eye image.

Hereinafter, a ninth embodiment of the invention will be described. FIG. 31 is a block diagram illustrating the configuration of the main portion of an image reading apparatus which is the ninth embodiment. FIG. 32 is a block diagram illustrating more specifically the portion A which is enclosed by a two-dot chain line in the configuration shown in FIG. 31. FIG. 33 is a diagram illustrating the manner of designating a reading range in the image reading apparatus in which FIG. 33(a) is a diagram showing the state where a bird's-eye image is displayed and FIG. 33(b) is a diagram showing the state where a frame line to be used in the designation of the reading range is superimposed on the bird's-eye image.

First, the image reading apparatus of the embodiment is described referring to FIGS. 31 and 32. The image reading apparatus according to the invention includes the following as main components: a mouse 504 for designating a desired display range of a front view image on the bird's-eye image (see FIG. 33(a)) which is displayed on a display device (not shown); a mouse interface circuit 505 for calculating the position in the screen designated by the mouse 504 in response to a signal output from the mouse 504 (hereinafter, an interface circuit is abbreviated as "I/F"); a range designating circuit 506 which generates the bird's-eye image and a frame line 600 (the portion indicated by the one-dot chain line in FIG. 33(b)) to be superimposed on the screen on the basis of the value calculated in the mouse I/F 505 to synthesize to the bird's-eye image and the frame line; a process image circuit 507 which accumulates image data read by an imaging and scanning unit, in the form of digital signals of a predetermined format; an instruction inputting circuit 508 for designating the resolution and the start of reading; and a main control circuit 509 which administers the controls among the area designating circuit 506, the process image circuit 507 and the instruction inputting circuit 508. In the configuration of FIG. 31, the components which are particularly related to the spirit of the invention are shown, and components which are generally used in an image reading apparatus are generally omitted.

FIG. 32 shows a specific configuration of the portion A which is enclosed by the two-dot chain line in FIG. 31. The portion A enclosed by the two-dot chain line realizes the portion which is related to the spirit of the invention that a frame line indicative of the range designated by the mouse 504 is displayed on a bird's-eye image. Specifically, the portion A includes: a mouse calculation circuit 510 which calculates the designated range in the screen on the basis of a signal output from the mouse 504; an image overlay circuit 511 which generates the frame line 600 indicated by a one-dot chain line in FIG. 33(b); a preview image I/F 512 which generates a bird's-eye image as a preview image from image data of the process image circuit 507; a synthesizing circuit 513 which synthesizes a signal output from the image overlay circuit 511 with a signal output from the preview image I/F 512; and a sub-control circuit 514 which controls the mouse calculation circuit 510, etc. based on signals from the main control circuit 509. A signal output from the synthesizing circuit 513 is transmitted to the display device (not shown) so that the screen is displayed as shown in FIG. 33(b).

The operation of the this apparatus will now be described. First, the imaging and scanning unit 330 mounted at the top of a supporting column 301 as shown in FIG. 27 partially scans a plurality of regions of the original 340, to read the whole of the original as a preview image. The read image data of the original 340 which consist of plural division images are accumulated as digital image signals in the process image circuit 507 shown in FIG. 32. The image data accumulated in the process image circuit 507 are input to the preview image I/F 512, and subjected to processes such as image synthesis to be displayed as a bird's-eye image (see FIG. 33(a)).

While watching this bird's-eye image, the user operates the mouse 504 to designate the range which is intended to be finally displayed as a front view image. This causes the frame line 600 generated in the image overlay circuit 511 to be superimposed on the bird's-eye image (see FIG. 33(b)). Then, the bird's-eye image within the range of the frame line 600 is converted into a front view image and displayed on the display device (this is not shown in the figures).

The series of procedures in the image reading apparatus are basically similar to those shown in FIG. 28, and their contents will be described with reference to this figure.

First, in step S400, a resolution is designated. Specifically, a desired resolution is input by the operation of the user through the instruction inputting unit 508. At the same time as the resolution is designated, the reading of the original 340 is started (step S402).

Then, the image processing for the whole image of the original 340 (an operation which is called "prescan") is performed by the imaging and scanning unit 330 (step S404). This whole imaging is automatically performed, and simultaneously the edge detection of the original 340 is performed (step S406). The edge is detected, for example, by detecting a contrast between the original 340 and a surface on which the original 340 is placed (for example, the upper surface of a desk, and a black sheet). In this step S406, although not shown in FIG. 28, the image obtained when looking down upon the whole of the original, i.e., the bird's-eye image is displayed at the same time as the edge detection.

This bird's-eye image is generated as follows: division images are supplied from the process image circuit 507 to the preview image I/F 512 and synthesized therein to generate the bird's-eye image. When the user operates the mouse 504, the frame line 600 is superimposed on the bird's-eye image (see FIG. 33(b)). The mouse 504 is further operated to expand or reduce the frame line 600 to the range which is intended to be displayed as the front view image, thereby completing the range designation on the bird's-eye image. The generation of the frame line 600 and superimposing on the bird's-eye image instructed by the mouse 504 are processed in the image overlay circuit 511 and synthesizing circuit 513.

In step S408, the size of the original 340 is calculated. In the series process for whole imaging which is performed in step S402 and the following steps, the adjustment of focal point is performed (this step is not shown in the flowchart). The size of the original 340 is determined (for example, it is determined whether the size is A4, B5 or the like), based on the distance and angle information with respect to the image to be read on the original 340 and the imaging and scanning unit 330.

In step S410, the inclination of the original 340 is detected. The term, the "inclination" in this context means the inclination of the original 340 with respect to the vertical direction of a screen (the direction along a line elongating from top to bottom of the sheet in FIG. 33(a)) in the case that the read image of the original 340 is displayed on the screen as shown in FIG. 33(a). If it is previously known that the original 340 is not inclined, and the resolution can be left out of consideration, steps S410 and S412 which are described below may be skipped, so that the process proceeds directly to step S414. If the size of the original 340 and the inclination degree of the original 340 are previously known, the process may directly proceed to step S412 which is described below, while skipping steps S402 through S410.

In step S412, a zooming quantity is calculated based on the desired resolution, which is previously set through the instruction inputting unit 508, and the image of the original 340, which is currently obtained, and an image forming optical system (not shown) in the imaging and scanning unit 330 is set. Following this, the process proceeds to step S414 where the number of division images for divisionally scanning the original 340 is calculated based on the calculated size of the original 340 and the calculated zooming quantity.

In step S416, prior to the start of the division scan, necessary initialization is performed on both the software and hardware. In step S418, the division scan for the calculated number of division images of the original 340 is performed by the imaging and scanning unit 330 as shown in FIG. 27. After completing the scan, the process advances to step S420 where the gradation of each division image is corrected.

In step S422, it is judged whether all the images obtained by the division scan constitute a background i.e., it is judged whether the images are uniform in density. If it is judged to be uniform (YES), the process proceeds to step S428. If it is judged not to be uniform (NO), the process proceeds to step S424.

In step S424, a distortion correcting process is performed for geometrically correcting the distortion of the division image caused by imaging the original 340 obliquely from above. Then, the process advances to step S426 where a process of connecting the division images is performed. The connecting process is continued until it is determined in step S428 that the connecting process is completed. After completing the connecting process, only the image data within the range designated by using the mouse 504 are converted into a front view image to be displayed (step S430).

According to the embodiment, the range which is to be converted into a front image is designated in a bird's-eye image without processing this image, and the bird's-eye image within the designated range is subjected to the connecting process to be converted into a front image. Therefore, as compared with the case where a bird's-eye image of the whole of an original is converted at once to a front image and a desired reading range and position are designated on the front image of the whole original, the processing burden of both the hardware and software can be reduced and the processing time period can be shortened.

The foregoing description of the preferred embodiment has been presented to illustrate the invention. It is not intended to be exhaustive or to limit the invention to the form disclosed. In applying the invention, modifications and variations can be made by those skilled in the pertaining art without departing from the scope and spirit of the invention. It is intended that the scope of the invention be defined by the claims appended hereto, and their equivalents.

What is claimed is:

1. An image reading apparatus for reading an original image, comprising:

an imaging device;

optical means located for exposing said imaging device and capable of moving in two directions perpendicular to each other;

a reading operation control unit for controlling a first reading operation in which whole information of said original image is read, and a second reading operation in which division image information in division areas of said original image is read;

resolution setting means for setting a resolution in said second reading operation;

a data processing unit for connecting a plurality of adjacent division image information sets which are read in a plural number of times in said second reading operation, so as to generate front view image information of said original image;

said data processing unit including edge information detection means for detection edge information of images of a whole image and division images, said whole image being detected in said first reading operation, said division images being read in said second reading operation;

positioning means for positioning said division images in said whole image so that each of said division images is coarsely positioned on the basis of edge correlation between edge information of said whole image and edge information of said division images; and an image synthesis unit for synthesizing and registering said division images precisely on the basis of said edge information of adjacent division images positioned by said positioning means.

2. The image reading apparatus according to claim 1, further comprising a magnification control mechanism and a focal point control mechanism which are used for said optical means.

3. The image reading apparatus according to claim 1, further comprising original inclination calculation means for calculating an inclination of said original image from said whole image information.

4. The image reading apparatus according to claim 1, further comprising original edge information detection means for detecting original edge information of said original from said whole image information.

5. The image reading apparatus according to claim 1, further comprising division number setting means for setting division areas for said second reading operation from said resolution.

6. The image reading apparatus according to claim 1, further comprising means for detecting distance information on a distance said optical means and said original image and angle information on an angle formed by said optical means and said original image.

7. The image reading apparatus according to claim 1, further comprising original size detection means for detecting a size of said original image from said original edge information, distance information and angle information.

8. The image reading apparatus according to claim 1, wherein said optical means includes a zooming mechanism, and said apparatus further comprising zooming quantity calculation means for calculating a zooming quantity from said resolution.

9. The image reading apparatus according to claim 1, further comprising distortion correction means for correcting distortion of said division image information.

10. The image reading apparatus according to claim 1, wherein said resolution setting means sets said resolution in said second reading operation to be higher than a resolution in said first reading operation.

11. The image reading apparatus according to claim 1, further comprising shading correction means for calculating shading information from said whole information of the original image, and for performing a shading correction after said synthesizing and registering process.

12. An image reading apparatus for reading an original image, comprising:

an imaging device;

optical means located for exposing said imaging device and capable of moving in two directions perpendicular to each other;

a reading operation control unit for controlling a first reading operation in which whole information of said original image is read, and a second reading operation in which division image information in division areas of said original image is read;

resolution setting means for setting a resolution in said second reading operation;

a data processing unit for connecting a plurality of adjacent division image information sets which are read in a plural number of times in said second reading operation, so as to generate front view image information of said original image;

distortion correction means for correcting distortion of said division image information; and density determining means for determining whether said division image areas are uniform in density, wherein said distortion correction is skipped when said division image areas are uniform in density.

13. An image reading apparatus for reading an original image, comprising:

an imaging device;

optical means located for exposing said imaging device and capable of moving in two directions perpendicular to each other;

a reading Operation control unit for controlling a first reading operation in which whole information of said original image is read, and a second reading operation in which division image information in division areas of said original image is read;

resolution setting means for setting a resolution in said second reading operation;

a data processing unit for connecting a plurality of adjacent division image information sets which are read in a plural number of times in said second reading operation, so as to generate front view image information of said original image; and said data processing unit preferentially performing a synthesis process on division image information sets of a center portion of said original image.

14. An image reading apparatus for reading an original image, comprising:

an imaging device;

optical means located for exposing said imaging device and capable of moving in two directions perpendicular to each other;

a reading operation control unit for controlling a first reading operation in which whole information of said original image is read, and a second reading operation in which division image information in division areas of said original image is read;

resolution setting means for setting a resolution in said second reading operation;

a data processing unit for connecting a plurality of adjacent division image information sets which are read in a plural number of times in said second reading operation, so as to generate front view image information of said original image;

division number setting means for setting division areas for said second reading operation from said resolution; and said division image information having information of an area which is wider than said division area, and said adjacent sets of division image information having an overlap portion.

15. An image reading apparatus for reading an original image, comprising:

an imaging device;

optical means located for exposing said imaging device and capable of moving in two directions perpendicular to each other;

a reading operation control unit for controlling a first reading operation in which whole information of said original image is read, and a second reading operation in which division image information in division areas of said original image is read;

resolution setting means for setting a resolution in said second reading operation;

a data processing unit for connecting a plurality of adjacent division image information sets which are read in a plural number of times in said second reading operation, so as to generate front view image information of said original image; and said data processing unit including density variance value detection means for detecting a density variance value of synthesis areas of said division images, and connecting-sequence determining means for determining a sequence of connecting said adjacent division image information sets from said density variance value.

16. An image reading apparatus for reading an original image, comprising:

an imaging device;

optical means located for exposing said imaging device and capable of moving in two directions perpendicular to each other;

a reading operation control unit for controlling a first reading operation in which whole information of said original image is read, and a second reading operation in which division image information in division areas of said original image is read;

resolution setting means for setting a resolution in said second reading operation;

a data processing unit for connecting a plurality of adjacent division image information sets which are read in a plural number of times in said second reading operation, so as to generate front view image information of said original image; and said data processing unit including average density detection means for detecting and outputting an average density of pixels in the neighborhood of synthesis areas of said division images.

17. The image reading apparatus according to claim 14, wherein said reading operation control unit performs a reading of each division image in said second reading operation, in accordance with a geometrical arrangement which is predetermined for each division image.

18. The image reading apparatus according to claim 17, wherein said geometrical arrangement is an arrangement in which a plurality of said overlap portions are shifted from each other in a vertical direction of said original.

19. The image reading apparatus according to claim 17, wherein said geometrical arrangement is an arrangement in which a plurality of said overlap portions are shifted from each other in a lateral direction of said original.

20. An image reading apparatus for reading an original image, comprising:

an imaging device;

optical means located for exposing said imaging device and capable of moving in two directions perpendicular to each other;

a reading operation control unit for controlling a first reading operation in which whole information of said original image is read, and a second reading operation in which division image information in division areas of said original image is read;

resolution setting means for setting a resolution in said second reading operation;

image display means for displaying said original image which is read in said first reading operation, wherein an area designated by said designating means is displayed together with said original image on said image display means;

further comprising reading area designating means for designating a reading area in said second reading operation, and original image display means for displaying an original image which is read in said first reading operation; and a data processing unit for connecting a plurality of adjacent division image information sets which are read in a plural number of times in said second reading operation, so as to generate front view image information which corresponds to said designated area only;

wherein only the front view image information which corresponds to said designated area is displayed again on said original image display means.

* * * * *